United States Patent
Gallagher et al.

(10) Patent No.: US 7,957,348 B1
(45) Date of Patent: Jun. 7, 2011

(54) METHOD AND SYSTEM FOR SIGNALING TRAFFIC AND MEDIA TYPES WITHIN A COMMUNICATIONS NETWORK SWITCHING SYSTEM

(75) Inventors: Michael D. Gallagher, San Jose, CA (US); Puneet Goel, Mountain View, CA (US); Milan Markovic, Pleasanton, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 1123 days.

(21) Appl. No.: 11/110,222

(22) Filed: Apr. 20, 2005

Related U.S. Application Data

(60) Provisional application No. 60/564,566, filed on Apr. 21, 2004, provisional application No. 60/651,312, filed on Feb. 9, 2005.

(51) Int. Cl.
*H04W 4/00* (2009.01)
*H04M 1/00* (2006.01)

(52) U.S. Cl. .............. 370/331; 455/450; 455/426.1; 455/552.1; 455/436; 370/328; 370/338

(58) Field of Classification Search .......... 455/450–453, 455/552.1, 436–439, 553.1, 426.1; 370/431–433
See application file for complete search history.

(56) References Cited

U.S. PATENT DOCUMENTS

| | | | |
|---|---|---|---|
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellineig et al. |
| 5,267,261 A | 11/1993 | Blakeney, II et al. |
| 5,327,578 A | 7/1994 | Breeden et al. |
| 5,333,175 A | 7/1994 | Ariyavisitakul |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |

(Continued)

FOREIGN PATENT DOCUMENTS

EP 0936777 8/1999

(Continued)

OTHER PUBLICATIONS

Digital cellular telecommunications system (Phase 2+);Mobile radio interface layer 3 specification (3GPP TS 04.08 version 7.19.1 Release 1998), p. 60-2, 336-337.*

(Continued)

*Primary Examiner* — Lester Kincaid
*Assistant Examiner* — Daniel Lai
(74) *Attorney, Agent, or Firm* — Adeli & Tollen LLP

(57) ABSTRACT

Signaling regarding traffic and media types within a communications network control system is described. In one embodiment, the invention includes receiving an assignment request message from a call server of a communications network, the assignment request message including a description of a bearer connection between a subscriber and the communications network, sending a channel activation request to the subscriber, the channel activation request including at least a portion of the description of the bearer connection between the subscriber and the communications network, receiving connection information about a channel activated by the subscriber in response to the channel activation request, and sending the connection information to the call server to allow the call server to modify the bearer connection.

12 Claims, 13 Drawing Sheets

U.S. PATENT DOCUMENTS

| | | | |
|---|---|---|---|
| 5,442,680 A | 8/1995 | Schellinger et al. | |
| 5,448,619 A | 9/1995 | Evans et al. | |
| 5,475,677 A | 12/1995 | Arnold et al. | |
| 5,488,649 A | 1/1996 | Schellinger | |
| 5,507,035 A | 4/1996 | Bantz et al. | |
| 5,509,052 A | 4/1996 | Chia et al. | |
| 5,515,420 A | 5/1996 | Urasaka et al. | |
| 5,533,027 A | 7/1996 | Akerberg et al. | |
| 5,594,782 A | 1/1997 | Zicker et al. | |
| 5,610,969 A | 3/1997 | McHenry | |
| 5,634,193 A | 5/1997 | Ghisler | |
| 5,640,414 A | 6/1997 | Blakeney, II et al. | |
| 5,659,598 A | 8/1997 | Byrne | |
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison et al. | |
| 5,796,729 A | 8/1998 | Greaney et al. | |
| 5,812,522 A | 9/1998 | Lee et al. | |
| 5,815,525 A | 9/1998 | Smith | |
| 5,818,820 A | 10/1998 | Anderson et al. | |
| 5,822,681 A | 10/1998 | Chang et al. | |
| 5,822,767 A | 10/1998 | MacWilliams et al. | |
| 5,825,759 A | 10/1998 | Liu | |
| 5,852,767 A | 12/1998 | Sugita | |
| 5,862,345 A | 1/1999 | Okanoue et al. | |
| 5,870,677 A | 2/1999 | Takahashi et al. | |
| 5,887,020 A | 3/1999 | Smith et al. | |
| 5,887,260 A | 3/1999 | Nakata | |
| 5,890,055 A | 3/1999 | Chu et al. | |
| 5,890,064 A | 3/1999 | Widergen et al. | |
| 5,903,834 A | 5/1999 | Wallstedt et al. | |
| 5,915,224 A | 6/1999 | Jonsson | |
| 5,926,760 A | 7/1999 | Khan et al. | |
| 5,936,949 A | 8/1999 | Pasternak et al. | |
| 5,940,512 A | 8/1999 | Tomoike | |
| 5,946,622 A | 8/1999 | Bojeryd | |
| 5,949,773 A | 9/1999 | Bhalla et al. | |
| 5,960,341 A | 9/1999 | LeBlanc et al. | |
| 5,960,361 A | 9/1999 | Chen | |
| 5,960,364 A | 9/1999 | Dent | |
| 5,987,010 A | 11/1999 | Schnizlein | |
| 5,995,500 A | 11/1999 | Ma et al. | |
| 5,995,828 A | 11/1999 | Nishida | |
| 6,016,318 A | 1/2000 | Tomoike | |
| 6,035,193 A | 3/2000 | Buhrmann et al. | |
| 6,052,592 A | 4/2000 | Schellinger et al. | |
| 6,101,176 A | 8/2000 | Honkasalo | |
| 6,112,080 A | 8/2000 | Anderson et al. | |
| 6,112,088 A | 8/2000 | Haartsen | |
| 6,119,000 A | 9/2000 | Stephenson et al. | |
| 6,130,886 A | 10/2000 | Ketseoglou et al. | |
| 6,134,227 A | 10/2000 | Magana | |
| 6,138,019 A | 10/2000 | Trompower et al. | |
| 6,167,279 A | 12/2000 | Chang et al. | |
| 6,226,515 B1 | 5/2001 | Burkhard | |
| 6,229,792 B1 | 5/2001 | Anderson et al. | |
| 6,236,852 B1 | 5/2001 | Veerasamy et al. | |
| 6,243,581 B1 | 6/2001 | Jawanda | |
| 6,256,511 B1 | 7/2001 | Brown | |
| 6,263,211 B1 | 7/2001 | Brunner | |
| 6,269,086 B1 | 7/2001 | Magana et al. | |
| 6,320,873 B1 | 11/2001 | Nevo et al. | |
| 6,327,470 B1 | 12/2001 | Ostling | |
| 6,359,872 B1 | 3/2002 | Mahany et al. | |
| 6,374,102 B1 | 4/2002 | Brachman et al. | |
| 6,381,457 B1 | 4/2002 | Carlsson et al. | |
| 6,389,059 B1 | 5/2002 | Smith et al. | |
| 6,393,007 B1 | 5/2002 | Haartsen | |
| 6,415,158 B1 | 7/2002 | King et al. | |
| 6,415,410 B1 * | 7/2002 | Kanerva et al. | 714/749 |
| 6,426,819 B1 | 7/2002 | Crimmins et al. | |
| 6,430,395 B2 | 8/2002 | Arazi et al. | |
| 6,438,383 B1 | 8/2002 | Hall et al. | |
| 6,445,921 B1 | 9/2002 | Bell | |
| 6,463,307 B1 | 10/2002 | Larsson et al. | |
| 6,498,934 B1 | 12/2002 | Muller | |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo et al. | |
| 6,600,925 B1 | 7/2003 | Rams | |
| 6,633,614 B1 | 10/2003 | Barton et al. | |
| 6,633,761 B1 | 10/2003 | Singhal | |
| 6,643,512 B1 | 11/2003 | Ramaswamy | |
| 6,647,426 B2 | 11/2003 | Mohammed | |
| 6,654,610 B1 * | 11/2003 | Chen et al. | 455/450 |
| 6,658,250 B1 | 12/2003 | Ganesan et al. | |
| 6,665,276 B1 | 12/2003 | Culbertson et al. | |
| 6,675,009 B1 | 1/2004 | Cook | |
| 6,680,923 B1 | 1/2004 | Leon | |
| 6,683,853 B1 * | 1/2004 | Kannas et al. | 370/230 |
| 6,711,400 B1 | 3/2004 | Aura | |
| 6,766,160 B1 | 7/2004 | Lemilainen | |
| 6,788,656 B1 | 9/2004 | Smolentzov et al. | |
| 6,801,519 B1 | 10/2004 | Mangal | |
| 6,801,772 B1 | 10/2004 | Townend et al. | |
| 6,801,777 B2 | 10/2004 | Rusch | |
| 6,807,417 B2 | 10/2004 | Sallinen | |
| 6,823,154 B2 | 11/2004 | Koga et al. | |
| 6,824,048 B1 | 11/2004 | Itabashi et al. | |
| 6,826,154 B2 | 11/2004 | Subbiah et al. | |
| 6,829,227 B1 | 12/2004 | Pitt | |
| 6,842,462 B1 | 1/2005 | Ramjee et al. | |
| 6,842,621 B2 | 1/2005 | Labun et al. | |
| 6,845,095 B2 | 1/2005 | Krishnarajah et al. | |
| 6,850,503 B2 | 2/2005 | Dorenbosch | |
| 6,853,851 B1 * | 2/2005 | Rautiola et al. | 455/553.1 |
| 6,895,255 B1 | 5/2005 | Bridgelall | |
| 6,909,705 B1 | 6/2005 | Lee et al. | |
| 6,910,074 B1 * | 6/2005 | Amin et al. | 709/227 |
| 6,922,559 B2 | 7/2005 | Mohammed | |
| 6,925,074 B1 | 8/2005 | Vikberg et al. | |
| 6,937,862 B2 | 8/2005 | Back et al. | |
| 6,957,249 B2 | 10/2005 | Salo et al. | |
| 6,970,719 B1 | 11/2005 | McConnell et al. | |
| 6,993,359 B1 | 1/2006 | Nelakanti et al. | |
| 7,009,952 B1 | 3/2006 | Razavilar et al. | |
| 7,028,186 B1 | 4/2006 | Stenman et al. | |
| 7,039,025 B1 | 5/2006 | Menon et al. | |
| 7,065,353 B1 | 6/2006 | Bolinth et al. | |
| 7,099,339 B1 | 8/2006 | Wang et al. | |
| 7,200,112 B2 | 4/2007 | Sundar et al. | |
| 7,200,383 B2 | 4/2007 | Eronen | |
| 7,231,046 B1 | 6/2007 | Einola et al. | |
| 7,245,916 B2 | 7/2007 | Gallagher et al. | |
| 7,283,821 B2 | 10/2007 | Gallagher et al. | |
| 7,389,412 B2 | 6/2008 | Sharma et al. | |
| 7,420,964 B2 | 9/2008 | Narvanen et al. | |
| 7,471,655 B2 | 12/2008 | Gallagher et al. | |
| 7,684,803 B2 | 3/2010 | Gallagher et al. | |
| 7,769,385 B2 | 8/2010 | Gallagher et al. | |
| 7,773,993 B2 | 8/2010 | Gallagher et al. | |
| 2001/0029186 A1 | 10/2001 | Canyon et al. | |
| 2001/0031645 A1 | 10/2001 | Jarrett | |
| 2001/0046860 A1 | 11/2001 | Lee | |
| 2001/0049790 A1 | 12/2001 | Faccin et al. | |
| 2002/0009199 A1 | 1/2002 | Ala-Laurila et al. | |
| 2002/0036983 A1 * | 3/2002 | Widegren et al. | 370/352 |
| 2002/0045459 A1 | 4/2002 | Morikawa | |
| 2002/0051463 A1 * | 5/2002 | Higuchi | 370/352 |
| 2002/0059516 A1 | 5/2002 | Turtiainen et al. | |
| 2002/0065099 A1 | 5/2002 | Bjorndahl | |
| 2002/0066036 A1 | 5/2002 | Makineni | |
| 2002/0075844 A1 | 6/2002 | Hagen | |
| 2002/0080797 A1 | 6/2002 | Kim | |
| 2002/0082015 A1 | 6/2002 | Wu | |
| 2002/0775844 | 6/2002 | Hagen | |

| | | |
|---|---|---|
| 2002/0085516 A1 | 7/2002 | Bridgelall |
| 2002/0086682 A1 | 7/2002 | Naghian |
| 2002/0095599 A1* | 7/2002 | Hong et al. .................... 713/201 |
| 2002/0101848 A1 | 8/2002 | Lee et al. |
| 2002/0102974 A1 | 8/2002 | Raith |
| 2002/0114322 A1* | 8/2002 | Xu et al. ........................ 370/352 |
| 2002/0118674 A1 | 8/2002 | Faccin et al. |
| 2002/0120749 A1* | 8/2002 | Widegren et al. ............. 709/227 |
| 2002/0123325 A1 | 9/2002 | Cooper |
| 2002/0131387 A1 | 9/2002 | Pitcher et al. |
| 2002/0132630 A1 | 9/2002 | Arazi et al. |
| 2002/0142761 A1 | 10/2002 | Wallstedt et al. |
| 2002/0143874 A1* | 10/2002 | Marquette et al. ............ 709/204 |
| 2002/0147008 A1 | 10/2002 | Kallio |
| 2002/0147016 A1 | 10/2002 | Arazi et al. |
| 2002/0150091 A1 | 10/2002 | Lopponen et al. |
| 2002/0155829 A1 | 10/2002 | Proctor, Jr. et al. |
| 2002/0160811 A1 | 10/2002 | Jannette et al. |
| 2002/0161905 A1 | 10/2002 | Haverinen et al. |
| 2002/0166068 A1 | 11/2002 | Kilgore |
| 2002/0172209 A1* | 11/2002 | Ohta et al. .................... 370/235 |
| 2002/0174335 A1 | 11/2002 | Zhang et al. |
| 2002/0191556 A1 | 12/2002 | Krishnarajah et al. |
| 2002/0191575 A1 | 12/2002 | Kalavade et al. |
| 2002/0196840 A1 | 12/2002 | Anderson et al. |
| 2002/0197984 A1 | 12/2002 | Monin et al. |
| 2003/0007475 A1 | 1/2003 | Tsuda et al. |
| 2003/0018480 A1* | 1/2003 | Mecayten ...................... 704/277 |
| 2003/0026269 A1 | 2/2003 | Paryani |
| 2003/0031151 A1 | 2/2003 | Sharma et al. |
| 2003/0043773 A1 | 3/2003 | Chang |
| 2003/0087653 A1 | 5/2003 | Leung |
| 2003/0092445 A1 | 5/2003 | Timonen et al. |
| 2003/0112789 A1 | 6/2003 | Heinonen |
| 2003/0114158 A1* | 6/2003 | Soderbacka et al. .......... 455/552 |
| 2003/0119480 A1 | 6/2003 | Mohammed |
| 2003/0119490 A1 | 6/2003 | Mohammed |
| 2003/0119527 A1 | 6/2003 | Labun |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil |
| 2003/0172264 A1 | 9/2003 | Dillon |
| 2003/0176181 A1 | 9/2003 | Boesjes |
| 2003/0176186 A1 | 9/2003 | Mohammed |
| 2003/0193952 A1 | 10/2003 | O'Neill |
| 2003/0202486 A1 | 10/2003 | Anton et al. |
| 2003/0210199 A1 | 11/2003 | Sward et al. |
| 2003/0217132 A1 | 11/2003 | Batten et al. |
| 2003/0219022 A1 | 11/2003 | Dillon et al. |
| 2003/0219024 A1 | 11/2003 | Purnadi et al. |
| 2003/0226017 A1 | 12/2003 | Palekar et al. |
| 2003/0231623 A1* | 12/2003 | Ryu et al. ...................... 370/352 |
| 2003/0235186 A1 | 12/2003 | Park |
| 2004/0003060 A1 | 1/2004 | Asoh et al. |
| 2004/0008649 A1 | 1/2004 | Wybenga |
| 2004/0009749 A1 | 1/2004 | Arazi et al. |
| 2004/0010620 A1 | 1/2004 | Salo et al. |
| 2004/0013099 A1 | 1/2004 | O'Neill |
| 2004/0025018 A1 | 2/2004 | Haas et al. |
| 2004/0037312 A1 | 2/2004 | Spear |
| 2004/0053623 A1 | 3/2004 | Hoff et al. |
| 2004/0057408 A1 | 3/2004 | Gray |
| 2004/0063451 A1 | 4/2004 | Bonta et al. |
| 2004/0068571 A1 | 4/2004 | Ahmavaara |
| 2004/0068653 A1 | 4/2004 | Fascenda |
| 2004/0072593 A1 | 4/2004 | Robbins et al. |
| 2004/0077346 A1 | 4/2004 | Krenik et al. |
| 2004/0077354 A1 | 4/2004 | Jason et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0116120 A1 | 6/2004 | Gallagher et al. |
| 2004/0147223 A1 | 7/2004 | Cho |
| 2004/0171378 A1 | 9/2004 | Rautila |
| 2004/0192211 A1 | 9/2004 | Gallagher et al. |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2005/0064896 A1 | 3/2005 | Rautiola et al. |
| 2005/0070288 A1* | 3/2005 | Belkin et al. .................. 455/439 |
| 2005/0101245 A1 | 5/2005 | Ahmavaara |
| 2005/0101329 A1 | 5/2005 | Gallagher |
| 2005/0147077 A1 | 7/2005 | Sutinen |
| 2005/0181805 A1 | 8/2005 | Gallagher |
| 2005/0186948 A1 | 8/2005 | Gallagher |
| 2005/0198199 A1 | 9/2005 | Dowling |
| 2005/0207395 A1 | 9/2005 | Mohammed |
| 2005/0239441 A1 | 10/2005 | Eronen |
| 2005/0239453 A1 | 10/2005 | Vikberg et al. |
| 2005/0250522 A1 | 11/2005 | Gilbert et al. |
| 2005/0255879 A1 | 11/2005 | Shi |
| 2005/0260982 A1 | 11/2005 | Ko et al. |
| 2005/0265279 A1 | 12/2005 | Markovic |
| 2005/0266853 A1 | 12/2005 | Gallagher |
| 2005/0271008 A1 | 12/2005 | Gallagher |
| 2005/0272424 A1 | 12/2005 | Gallagher |
| 2005/0272449 A1 | 12/2005 | Gallagher |
| 2006/0009201 A1 | 1/2006 | Gallagher |
| 2006/0009202 A1 | 1/2006 | Gallagher |
| 2006/0019656 A1 | 1/2006 | Gallagher |
| 2006/0019657 A1 | 1/2006 | Gallagher |
| 2006/0019658 A1 | 1/2006 | Gallagher |
| 2006/0019667 A1 | 1/2006 | Hicks, III |
| 2006/0025143 A1 | 2/2006 | Gallagher |
| 2006/0025144 A1 | 2/2006 | Gallagher |
| 2006/0025145 A1 | 2/2006 | Gallagher |
| 2006/0025146 A1 | 2/2006 | Gallagher |
| 2006/0025147 A1 | 2/2006 | Gallagher |
| 2006/0079258 A1 | 4/2006 | Gallagher et al. |
| 2006/0079259 A1 | 4/2006 | Gallagher |
| 2006/0079273 A1 | 4/2006 | Gallagher |
| 2006/0079274 A1 | 4/2006 | Gallagher |
| 2006/0094416 A1 | 5/2006 | Endo et al. |
| 2006/0094431 A1 | 5/2006 | Saifullah et al. |
| 2006/0098598 A1 | 5/2006 | Gallagher |
| 2006/0111113 A1 | 5/2006 | Waris |
| 2006/0166687 A1 | 7/2006 | Edman |
| 2006/0209799 A1 | 9/2006 | Gallagher et al. |
| 2006/0276139 A1 | 12/2006 | Pummill et al. |
| 2007/0041360 A1 | 2/2007 | Gallagher et al. |
| 2007/0058609 A1 | 3/2007 | Goel et al. |
| 2007/0242672 A1 | 10/2007 | Grayson et al. |
| 2007/0259673 A1 | 11/2007 | Willars et al. |
| 2007/0293222 A1 | 12/2007 | Vikberg et al. |
| 2008/0043669 A1 | 2/2008 | Gallagher et al. |
| 2008/0102801 A1 | 5/2008 | Lazaridis et al. |
| 2008/0130568 A1 | 6/2008 | Gallagher et al. |
| 2008/0181204 A1 | 7/2008 | Gallagher et al. |
| 2008/0299976 A1 | 12/2008 | Gallagher et al. |
| 2008/0311916 A1 | 12/2008 | Gallagher et al. |
| 2009/0082012 A1 | 3/2009 | Gallagher et al. |

FOREIGN PATENT DOCUMENTS

| | | |
|---|---|---|
| EP | 0936777 A1 | 8/1999 |
| EP | 1207708 | 5/2002 |
| EP | 1207708 B1 | 10/2004 |
| GB | 2282735 | 4/1995 |
| GB | 2282735 A | 4/1995 |
| JP | 06-133358 | 5/1994 |
| JP | 09-130405 | 5/1997 |
| KR | 2001-0053160 | 6/2001 |
| WO | WO 92/04796 | 3/1992 |
| WO | WO 9204796 A1 | 3/1992 |
| WO | WO 95/10922 | 4/1995 |
| WO | WO 97/24004 | 7/1997 |
| WO | WO 9724004 A1 | 7/1997 |
| WO | WO 99/48312 | 9/1999 |
| WO | WO 99/48315 | 9/1999 |
| WO | WO 9948312 A1 | 9/1999 |
| WO | WO 9948315 A1 | 9/1999 |
| WO | WO 99/57876 | 11/1999 |
| WO | WO 99/67967 | 12/1999 |
| WO | WO 00/28762 | 5/2000 |
| WO | WO 0028762 A1 | 5/2000 |
| WO | WO 00/51387 | 8/2000 |

| | | |
|---|---|---|
| WO | WO 0051387 A1 | 8/2000 |
| WO | WO 02/45456 A1 | 6/2002 |
| WO | WO 02/062094 | 8/2002 |
| WO | WO 03/039009 | 5/2003 |
| WO | WO 03039009 A2 | 5/2003 |
| WO | WO 03039009 A3 | 5/2003 |
| WO | WO 03/092312 | 11/2003 |
| WO | WO 03092312 A1 | 11/2003 |
| WO | WO 04/002051 | 12/2003 |
| WO | WO 2004002051 A2 | 12/2003 |
| WO | WO 2004/034219 | 4/2004 |
| WO | WO 2004034219 A2 | 4/2004 |
| WO | WO 2004/039111 | 5/2004 |
| WO | WO 2004039111 A1 | 5/2004 |
| WO | WO 2005/006597 | 1/2005 |
| WO | WO 2005006597 A1 | 1/2005 |
| WO | PCT/US2005/013945 | 9/2005 |
| WO | WO 2005107297 A1 | 10/2005 |
| WO | WO 2005/107297 | 11/2005 |
| WO | WO 2005107169 A1 | 11/2005 |
| WO | WO 2005/114920 | 12/2005 |
| WO | PCT/US2005/040689 | 3/2006 |
| WO | WO 2005114918 A3 | 3/2006 |
| WO | WO 2006/086756 | 8/2006 |
| WO | PCT/US2005/013945 | 11/2006 |

OTHER PUBLICATIONS

U.S. Appl. No. 11/225,870, filed Sep. 12, 2005, Gallaher, Michael.
U.S. Appl. No. 11/227,842, filed Sep. 14, 2005, Gallagher, Michael.
U.S. Appl. No. 11/228,853, filed Sep. 15, 2005, Gallagher, Michael.
U.S. Appl. No. 11/229,470, filed Sep. 15, 2005, Gallagher, Michael.
U.S. Appl. No. 11/068,445, filed Feb. 24, 2005, Rajeev Gupta et al.
U.S. Appl. No. 11/080,714, filed Mar. 14, 2005, Satish Agrawal et al.
U.S. Appl. No. 11/097,866, filed Mar. 31, 2005, Michael D. Gallagher et al.
U.S. Appl. No. 11/107,538, filed Apr. 14, 2005, Geoffrey Mattson et al.
U.S. Appl. No. 10/116,023, filed Apr. 2, 2002, Mohammed, Jahangir.
U.S. Appl. No. 11/004,439, filed Dec. 3, 2004, Gallagher, Michael.
U.S. Appl. No. 11/255,398, filed Sep. 12, 2005, Gallagher, Michael.
U.S. Appl. No. 11/225,871, filed Sep. 12, 2005, Gallagher, Michael.
U.S. Appl. No. 11/225,872, filed Sep. 12, 2005, Gallagher, Michael.
U.S. Appl. No. 11/226,610, filed Sep. 13, 2005, Gallagher, Michael.
U.S. Appl. No. 11/226,617, filed Sep. 13, 2005, Gallagher, Michael.
U.S. Appl. No. 11/227,573, filed Sep. 14, 2005, Gallagher, Michael.
U.S. Appl. No. 11/227,784, filed Sep. 14, 2005, Gallagher, Michael.
U.S. Appl. No. 11/227,840, filed Sep. 14, 2005, Gallagher, Michael.
U.S. Appl. No. 10/116,311 (Non-Final Office Action mailed: Feb. 9, 2006), filed Apr. 2, 2002, Jahangir Mohammed.
U.S. Appl. No. 10/115,767 (Non-Final Office Action mailed: Dec. 22, 2005), filed Apr. 2, 2002, Jahangir Mohammed.
U.S. Appl. No. 10/115,835 (Non-Final Office Action mailed: Jul. 7, 2005), filed Apr. 2, 2002, Jahangir Mohammed.
U.S. Appl. No. 10/116,186 (Final Office Action mailed: Feb. 1, 2006), filed Apr. 2, 2002, Jahangir Mohammed.
U.S. Appl. No. 10/251,901 (Non-Final Office Action mailed: May 5, 2005), filed Sep. 20, 2002, Michael D. Gallagher.
U.S. Appl. No. 10/688,470 (Non-Final Office Action mailed: Dec. 15, 2005), filed Oct. 17, 2003, Michael D. Gallagher.
U.S. Appl. No. 11/004,439 (Non-Final Office Action mailed: Sep. 21, 2005), filed Dec. 3, 2004, Michael D. Gallagher.
Ericsson Press Release: "Ericsson presents the Mobile@Hometm concept," Mar. 21, 2001, http://www.ericsson.com/press/archive/2001Q1/20010321-0048.html, printed Mar. 21, 2006, pp. 1-2.
Claus Lindholt Hansen et al., "Mobile@Home- a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.

Wu, Jon C. et al., "Intelligent Handoff for Mobile Wireless Internet," *Mobile Networks and Applications*, 6, 2001 Kluwer Academic Publishers, Manufactured in the Netherlands (2001) 67-79.
"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
Portions of prosecution history of U.S. Appl. No. 11/225,872, Mailing Date Apr. 16, 2007, Gallagher, Michael, et al.
Portions of prosecution history of U.S. Appl. No. 11/225,871, Mailing Date Jun. 27, 2007, Gallagher, Michael, et al.
Portions of prosecution history of U.S. Appl. No. 11/128,615, Mailing Date Aug. 11, 2008, Gallagher, Michael, et al.
Portions of prosecution history of U.S. Appl. No. 11/778,041, Mailing Date Dec. 10, 2009, Gallagher, Michael, et al.
Portions of prosecution history of U.S. Appl. No. 11/927,665, Mailing Date Nov. 13, 2009, Gallagher, Michael, et al.
Portions of prosecution history of U.S. Appl. No. 12/192,532, Mailing Date Aug. 20, 2009, Gallagher, Michael, et al.
Portions of prosecution history of U.S. Appl. No. 12/194,442, Mailing Date Dec. 29, 2009, Gallagher, Michael, et al.
Portions of prosecution history of U.S. Appl. No. 12/328,732, Mailing Date Nov. 19, 2009, Gallagher, Michael, et al.
*Erricson Press Release*: "Ericsson presents the Mobile@Hometm concept," Mar. 21, 2001, http://www.ericsson.com/press/archive/2001Q1/20010321-0048.html, NPL Date Unknown, printed Jan. 6, 2004, pp. 1-2.
Claus Lindholt Hansen et al., "Mobile@Home- a New 1 Use Case for Bluetooth in the Access Network," *LM Ericsson Business Unit Multi-Service Networks*, ISSLS 2002, Apr. 14-18, 2002, Seoul, Korea, www.issis-council.org/proc02/papers/S6A3m.pdf, NPL Date Unknown, printed Dec. 8, 2003. 10 pages.
Wu, Jon C., et al., "Intelligent Handoff for Mobile Wireless Internet," *Mobile Networks and Applications*, Jan. 6, 2001 Kluwer Academic Publishers, Manufactured in the Netherlands (2001) pp. 67-79.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.

*Digital Enhanced Cordless Telecommunications (DECT); DECT/ UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001, 38 pages.

*Radio Equipment and Systems (RES); Digital Enhanced Cordless Telecommunications/Global System for Mobile Communications (DECT/GSM) Interworking Profile: Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.

"Unlicensed Mobile Access (UMA); User Perspective (Stage 1);" UMA User Perspective (Stage 1) R1.0.0 (Sep. 1, 2004) Technical Specification, 29 pages.

"Unlicensed Mobile Access (UMA); Architecture (Stage 2);" UMA Architecture (Stage 2) R1.0.0 (Sep. 1, 2004) Technical Specification, 78 pages.

"Unlicensed Mobile Access (UMA); Protocols (Stage 3);" UMA Protocols (Stage 3) R1.0.0 (Sep. 1, 2004) Technical Specification, 142 pages.

"Unlicensed Mobile Access (UMA); Architecture (Stage 2);" UMA Architecture (Stage 2) R1.0.1 (Oct. 8, 2004) Technical Specification, 80 pages.

"Unlicensed Mobile Access (UMA); Protocols (Stage 3);" UMA Protocols (Stage 3) R1.0.1 (Oct. 8, 2004) Technical Specification, 142 pages.

"Unlicensed Mobile Access (UMA); Architecture (Stage 2);" UMA Architecture (Stage 2) R1.0.2 (Nov. 3, 2004) Technical Specification, 79 pages.

"Unlicensed Mobile Access (UMA); Protocols (Stage 3);" UMA Protocols (Stage 3) R1.0.2 (Nov. 5, 2004) Technical Specification, 142 pages.

"Unlicensed Mobile Access (UMA); Architecture (Stage 2);" UMA Architecture (Stage 2) R1.0.3 (Feb. 2, 2005) Technical Specification, 85 pages.

"Unlicensed Mobile Access (UMA); Protocols (Stage 3);" UMA Protocols (Stage 3) R1.0.3 (Feb. 26, 2005) Technical Specification, 156 pages.

"3$^{rd}$ Generation Partnership Project; Technical Specification Group GSM/EDGE Radio Access Network; Generic Access to the A/Gb interface; Stage 2 (Release X);" 3GPP TS 43.318 V0.3.0, Jan. 2005, 64 pages.

"Proposal for Stage 2 description for Generic Access to A/Gb interface", Tdoc GP-050403, Jan. 24-28, 2005, 1 page.

"3$^{rd}$ Generation Partnership Project; Technical Specification Group GSM/EDGE Radio Access Network; Generic Access to the A/Gb interface; Stage 2 (Release 6)" 3GPP TS 43.318 V0.4.0, Jan. 2005, 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V2.0.0, Jan. 2005, 66 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.0.0, Jan. 2005, 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.1.0, Apr. 2005, 68 pages.

"Proposal for Stage 3 description for Generic Access to A/Gb interface", Tdoc GP-050279, Jan. 18, 2005, 1 page.

"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0, Jan. 2005, 133 pages.

"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0, Apr. 2005, 161 pages.

"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0, Apr. 2005, 160 pages.

"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0, Apr. 2005, 152 pages.

"3$^{rd}$Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0, Apr. 2005, 146 pages.

Portions of prosecution history of U.S. Appl. No. 11/222,529, Mailing Date Jun. 30, 2010, Goel, Puneet, et al.

Portions of prosecution history of U.S. Appl. No. 11/352,422, Mailing Date Dec. 30, 2008, Gallagher, Michael, et al.

Updated portions of prosecution history of U.S. Appl. No. 11/778,041, Mailing Date Jun. 22, 2010, Gallagher, Michael, et al.

Updated portions of prosecution history of U.S. Appl. No. 11/927,665, Mailing Date Aug. 3, 2010, Gallagher, Michael, et al.

Updated portions of prosecution history of U.S. Appl. No. 12/192,532, Mailing Date Jun. 21, 2010, Gallagher, Michael, et al.

Updated portions of prosecution history of U.S. Appl. No. 12/194,442, Mailing Date Feb. 23, 2010, Gallagher, Michael, et al.

Updated portions of prosecution history of U.S. Appl. No. 12/328,732, Mailing Date Jun. 14, 2010, Gallagher, Michael, et al.

International Search Report for PCT/US2006/004970, Aug. 2, 2006 (mailing date), Kineto Wireless Inc.

Written Opinion for PCT/US2006/004970 (mailing date) Aug. 2, 2006, (mailing date), Kineto Wireless Inc.

International Preliminary Report on Patentability for PCT/US2006/004970, Aug. 23, 2007 (mailing date), Kineto Wireless Inc.

* cited by examiner

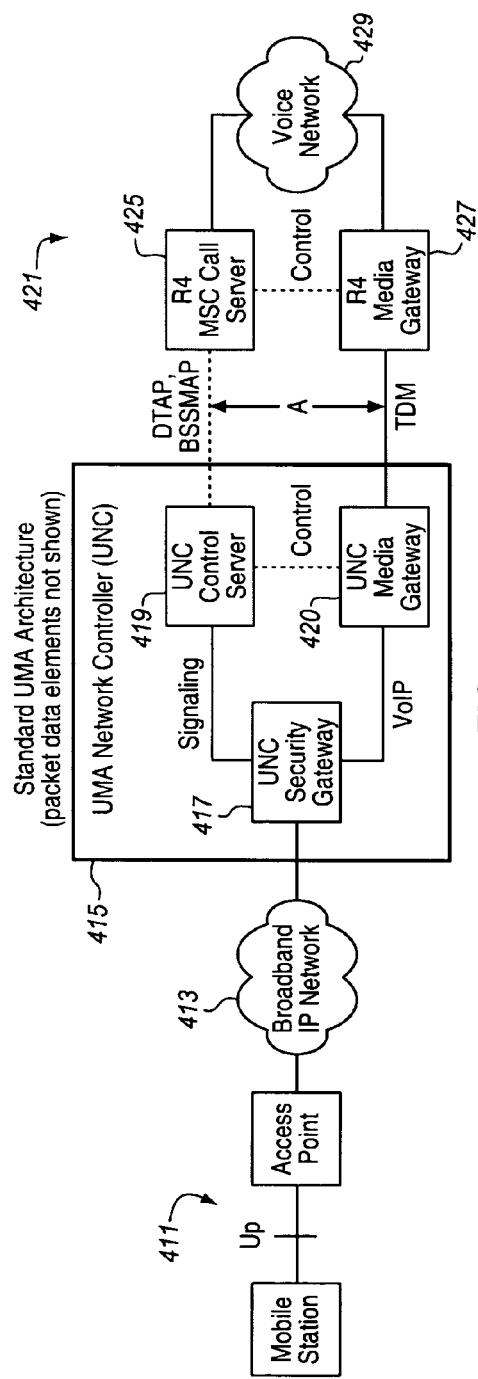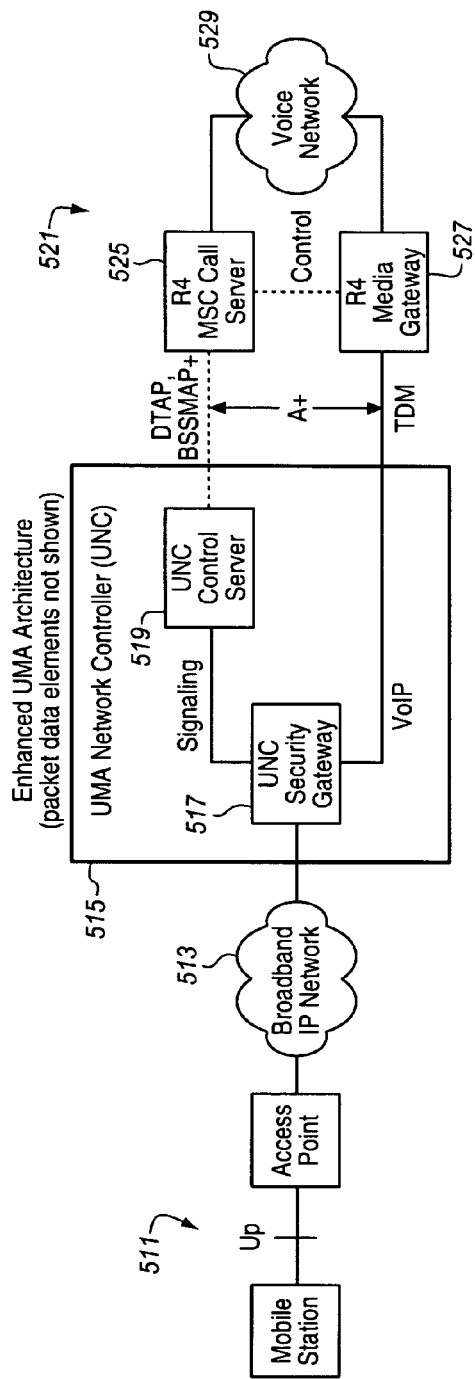
FIG. 4
FIG. 5

METHOD AND SYSTEM FOR SIGNALING TRAFFIC AND MEDIA TYPES WITHIN A COMMUNICATIONS NETWORK SWITCHING SYSTEM

CLAIM OF BENEFIT TO PRIOR APPLICATIONS

This application claims the priority of provisional patent application Ser. No. 60/564,566 filed Apr. 21, 2004 and entitled "A+ Interface Specification" and provisional patent application Ser. No. 60/651,312, filed Feb. 9, 2005, and entitled "An Improved Unlicensed Mobile Access Network (UMAN) System and Method."

This application is also related to commonly owned U.S. application Ser. No. 10/115,833, now issued as U.S. Pat. No. 6,922,559, entitled "Unlicensed Wireless Communications Base Station to Facilitate Unlicensed and Licensed Wireless Communications with a Subscriber Device, and Method of Operation," filed Apr. 2, 2002; and application Ser. No. 10/251,901, now issued as U.S. Pat. No. 7,308,263, entitled "Apparatus for Supporting the Handover of a Telecommunication Session between a Licensed Wireless System and an Unlicensed Wireless System," filed Sep. 20, 2002, the contents of each of which are hereby incorporated by reference.

FIELD OF THE INVENTION

The present description relates to communications with a call server in a public land mobile network, and, in particular, to communicating information about traffic formats and parameters with a call server.

BACKGROUND INFORMATION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks have seen rapid growth. For example, such unlicensed wireless systems may support wireless communication based on the IEEE 802.11a, b or g standards (WiFi), or the Bluetooth™ standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF (Radio Frequency) transceiver to facilitate communication with a wireless handset that is operative within a modest distance of the AP, wherein the data transport rates supported by the WiFi and Bluetooth™ standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system. In a conventional mobile communication system, the coding and format for voice and data traffic has a predetermined configuration. In order to communicate with equipment within the mobile communication system, any voice or data traffic must first be reconfigured to correspond to the predetermined norms.

Some portions of a mobile communications system may have transcoding equipment capable of changing voice or data encoding or formatting. However, since the transcoding equipment is designed only to work according to the predetermined norms, there may be no provision for reconfiguring the equipment to transcode into or out of other formats. In, for example, a GSM (Global System for Mobile Communication) base station subsystem, specialized media gateways (i.e., transcoder and rate adaptation units) are used to convert voice traffic from the coding and format of the cellular telephone to the PCM (Pulse Code Modulation) TDM (Time Division Multiplexed) format of the land network. To support other types of codecs, for example, those used in voice over IP, an additional TRAU is used to convert traffic between native voice over IP formats and native GSM formats. The additional components add complexity and expense to the system.

SUMMARY OF THE INVENTION

Signaling regarding traffic and media types within a communications network control system is described. In one embodiment, the invention includes receiving an assignment request message from a call server of a communications network, the assignment request message including a description of a bearer connection between a subscriber and the communications network, sending a channel activation request to the subscriber, the channel activation request including at least a portion of the description of the bearer connection between the subscriber and the communications network, receiving connection information about a channel activated by the subscriber in response to the channel activation request, and sending the connection information to the call server to allow the call server to modify the bearer connection.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 illustrates a conventional context for a UMA architecture in one embodiment without packet data elements;

FIG. 5 illustrates an enhanced UMA architecture in one embodiment also without packet data elements;

DETAILED DESCRIPTION

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present description the unlicensed wireless system may be a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Application of the present invention to this type of device enables the wireless service provider to offer so-called landline replacement service to users, even for user locations not sufficiently covered by the licensed wireless system. The present description is in the context of the UMA (Unlicensed Mobile Access) standardized architecture as promulgated by the UMA consortium. However, the invention is not so limited.

Throughout the following description, acronyms commonly used in the telecommunications industry for wireless services are utilized along with acronyms specific to the present invention. A table of acronyms specific to this application is included in Appendix I.

Figure 1A:
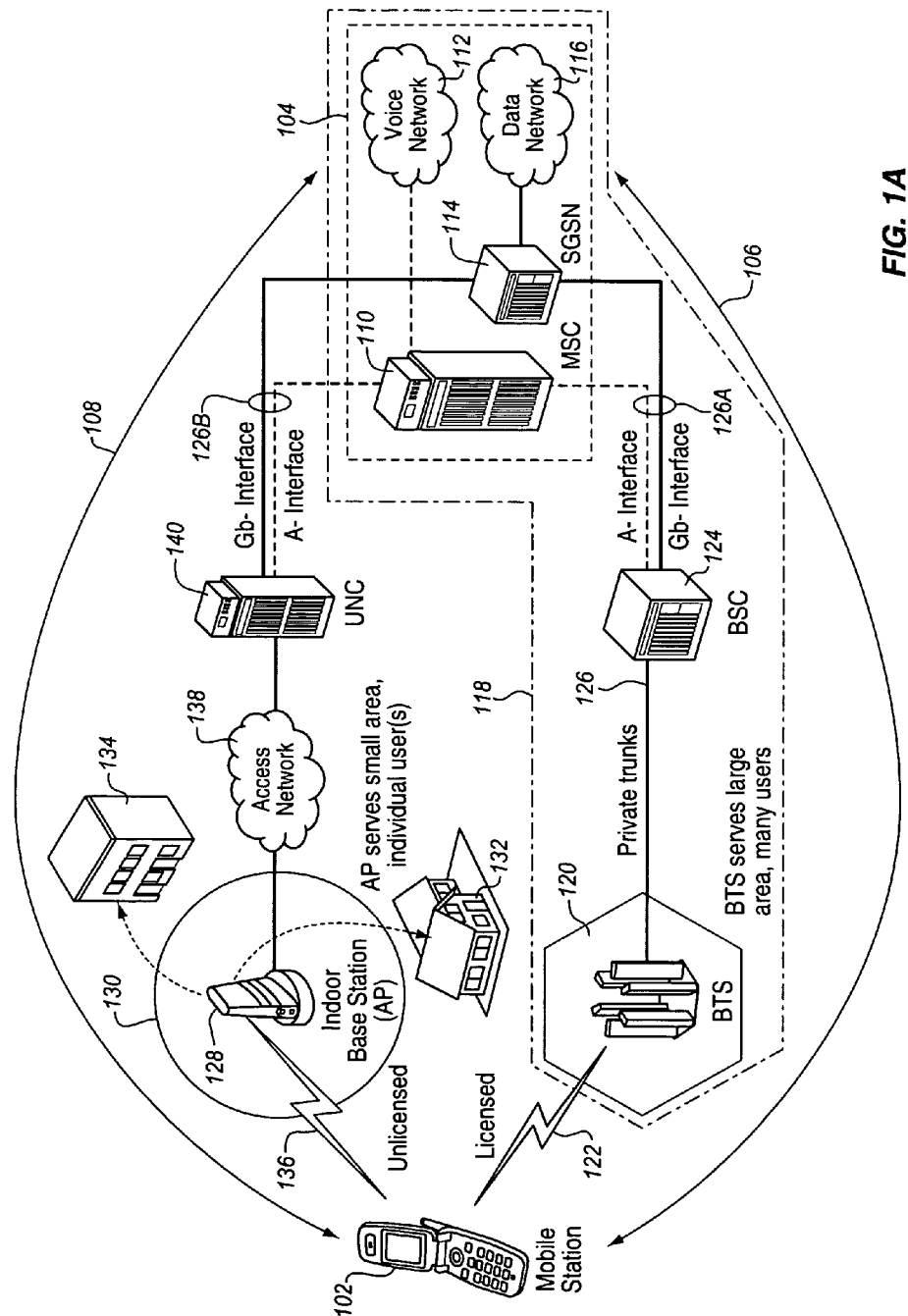
FIG. 1A provides an overview of the indoor access network (IAN) mobile service solution in accordance with one embodiment of the present invention.

FIG. 1A illustrates an Unlicensed Mobile Access (UMA) architecture 100 in accordance with one embodiment of the present invention. UMA architecture 100 enables a user of a mobile station 102 to access a voice and telecommunications network 104 via either a licensed wireless communications session 106, or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116. MSC 110 also provides an internal visitor location register (VLR) function.

In further detail, the licensed wireless communication session is facilitated by infrastructure provided by a licensed wireless network 118 that includes telecommunications network 104. In the illustrated embodiment, licensed wireless network 118 depicts components common to a GSM-(Global System for Mobile Communication) based cellular network that includes multiple base transceiver stations (BTS) 120 (of which only one is shown for simplicity) that facilitate wireless communication services for various mobile stations 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively-coupled to its BSC 124 via a private trunk 126. In general, a large licensed wireless network, such as that provided by a regional or nationwide mobile services provider, will include multiple BSCs 124.

Each BSC 124 communicates with telecommunications network 104 through a standard base station controller interface 126. For example, a BSC 124 may communicate with MSC 110 via the GSM A-interface for circuit switched voice services and with SGSN 114 via the GSM Gb interface for packet data services (GPRS). Conventional licensed voice and data networks 104 include protocols to permit seamless handoffs from one recognized BSC 124 to another BSC (not shown).

An unlicensed communication session 108 is facilitated via an (wireless) access point (AP) 128 comprising an indoor base station 130. Typically, AP 128 will be located in a fixed structure, such as a home 132 or an office building 134. The service area of indoor base station 130 includes an indoor portion of a building, although it will be understood that the service area of an indoor base station may include an outdoor portion of a building or campus. As indicated by the arrow representing unlicensed communication session 108, the mobile station 102 may be connected to the telecommunications network 114 via a second data path that includes an unlicensed wireless channel 136, access point 128, an access network 138, and an unlicensed mobile access network controller (UNC) 140. The UNC 140 communicates with telecommunications network 104 using a base station controller interface 126B that is similar to base station controller interface 126A, and includes a GSM A interface and Gb interface. Indoor base station 128 and indoor network controller 132 may include software entities stored in memory and executing on one or more microprocessors (not shown in FIG. 1A) adapted to perform protocol conversion.

Indoor base station 128 and UMA network controller 140 may also include software entities stored in memory and executing on one or more microprocessors (not shown in FIG. 1A) adapted to perform protocol conversion.

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As examples, the unlicensed wireless service may be a Bluetooth™ compatible wireless service, or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP). Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, the contents of which are hereby incorporated by reference.

Figure 1B:
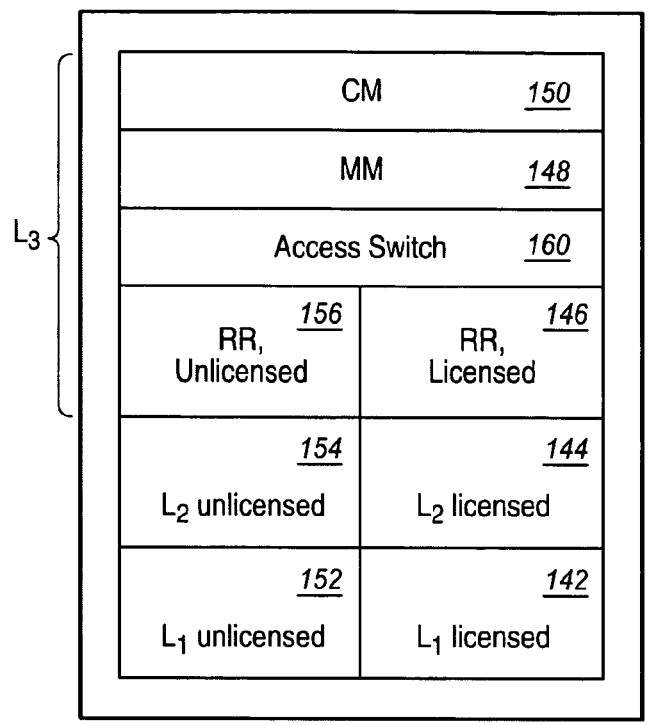
FIG. 1B illustrates protocol layers of a mobile set in accordance with one embodiment.

Mobile station 102 may include a microprocessor and memory (not shown) that stores computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150.

It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR sublayer is concerned with the management of an RR-session, which is the time that a mobile station is in a dedicated mode, as well as the configuration of radio channel, power controller, discontinuous transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

The mobile station may also include an unlicensed wireless service physical layer 152 (i.e., a physical layer for unlicensed wireless service such as Bluetooth, WiFi, or other unlicensed wireless channel (e.g., WiMAX)). The mobile station also includes an unlicensed wireless service level 2 link layer 154, and an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed AP 128 and to support switching between licensed RR sublayer 146 and unlicensed wireless service RR sublayer 156.

The unlicensed radio resource sublayer 156 and unlicensed link layer 154 may include protocols specific to the unlicensed wireless service utilized in addition to protocols selected to facilitate seamless handoff between licensed and unlicensed wireless systems. Consequently, the unlicensed radio resource sublayer 156 and unlicensed link layer 154 need to be converted into a format compatible with a conventional base station controller interface protocol 126 recognized by a MSC, SGSN, or other voice or data network.

Figure 1C:
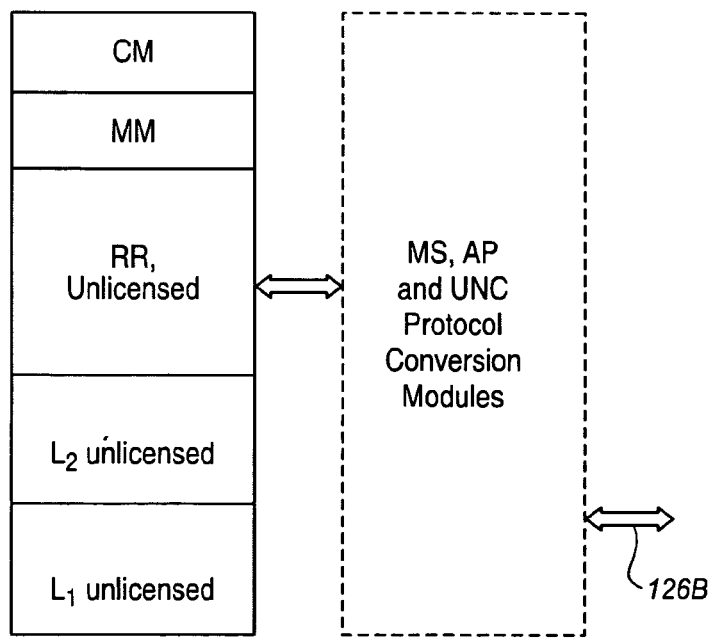
FIG. 1C illustrates a method of protocol conversion in accordance with one embodiment.

Referring to FIG. 1C, in one embodiment of the present invention, the mobile station 102, AP 128 and UNC 140 provide an interface conversion function to convert the level 1, level 2, and level 3 layers of the unlicensed service into a conventional base station subnetwork (BSS) interface 126B (e.g., an A-interface or a Gb-interface). As a result of the protocol conversion, a communication session may be established that is transparent to the voice network/data network 104, i.e., the voice/data network 104 uses its standard interface and protocols for the communication session as it would with a conventional communication session handled by a conventional base transceiver station. For example, in some embodiments the mobile station 102 and UNC 140 are configured to initiate and forward location update and service requests. As a result, protocols for a seamless handoff of services that is transparent to voice/data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 126 for a voice/data network 104. In one embodiment, the licensed wireless service is a GSM/GPRS radio access network, although it will be understood that embodiments of the present invention include other licensed wireless services. For this embodiment, the UNC 140 interconnects to the GSM core network via the same base station controller interfaces 126 used by a standard GSM BSS network element. For example, in a GSM application, these interfaces are the GSM A-interface for circuit switched voice services and the GSM Gb interface for packet data services (GPRS). In a UMTS (Universal Mobile Telecommunications System) application of the invention, the UNC 140 interconnects to the UMTS network using a UMTS Iu-cs interface for circuit switched voice services and the UMTS Iu-ps interface for packet data services. In a CDMA application of the invention, the UNC 140 interconnects with the CDMA network using the CDMA A1 and A2 interfaces for circuit switched voice services and the CDMA A10 and A11 interfaces for packet data services.

In a GSM/GPRS embodiment, UNC 140 appears to the GSM/GPRS core network as a GSM BSS network element and is managed and operated as such. In this architecture the principle elements of transaction control (e.g., call processing) are provided by higher network elements; namely the MSC 110 visitor location register (VLR) and the SGSN 114. Authorized mobile stations are allowed access to the GSM/GPRS core network either directly through the GSM radio access network if they are outside of the service area of an AP 128 or via the UMA network system if they are within the service area of an AP.

Since a communication session hosted by the UMA architecture 100 is transparent to a voice network 112 or data network 116, the unlicensed wireless service may support all user services that are typically offered by a wireless service provider. In the GSM case, this typically includes the following basic services: Telephony; Emergency call (e.g., E911 calling in North America); Short message, mobile-terminated point-to-point (MT/PP); Short message, mobile-originated point-to-point (MO/PP); GPRS bearer services; Handover (outdoor-to-indoor, indoor-to-outdoor, voice, data, SMS, SS). Additionally, GSM may also support, various supplementary services that are well-known in the art.

Figure 2A:
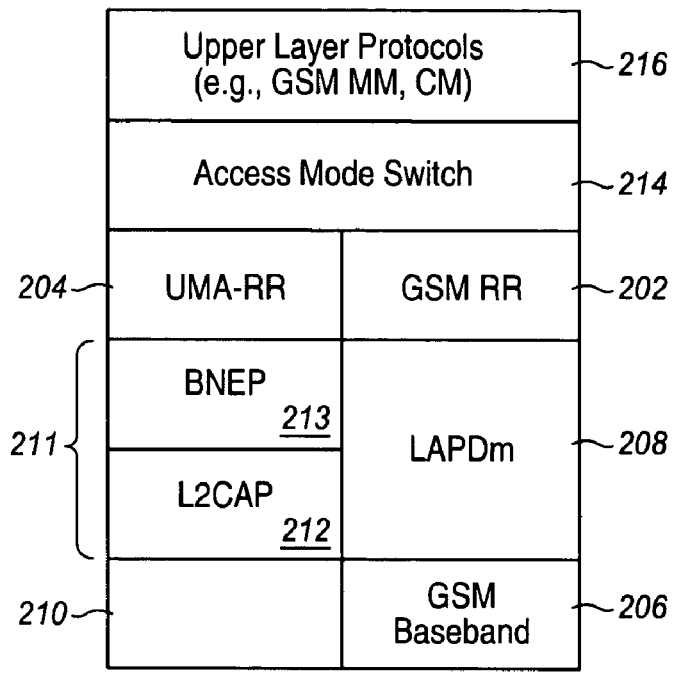
FIG. 2A illustrates an overview of a level 1, level 2, and level 3 GSM-related protocol architecture for one embodiment of a mobile station that provides unlicensed radio links via Bluetooth signaling.

FIG. 2A provides an overview of a level 1, level 2, and level 3 GSM-related protocol architecture for one embodiment of mobile station 102 that provides unlicensed radio links via Bluetooth signaling. As illustrated, there are two logical radio resource (RR) management entities: the GSM RR entity 202 and the UMA-RR entity 204. The protocol architecture includes a GSM baseband level 1 layer 206, GSM level 2 link layer (LAPDm) 208, Bluetooth baseband level 1 layer 210, Bluetooth level 2 layers 211 including a layer 2 connection access procedure (L2CAP) layer 212 and a BNEP layer 213, an access mode switch 214, and upper layer protocols 216. When the mobile station is operating in an UMA mode, the UMA-RR entity 204 is the current "serving" RR entity providing service to the mobility management (MM) sublayer via the designated service access point (RR-SAP). The GSM RR entity is detached from the MM sublayer in this mode. The UMA-RR entity 204 provides a new set of functions, and is responsible for several tasks. First the UMA-RR entity is responsible for discovery of UMA coverage and UMA registration. Second, the UMA-RR entity is responsible for emulation of the GSM RR layer to provide the expected services to the MM layer; i.e., create, maintain and tear down RR connections. All existing GSM 04.07 primitives defined for the RR-SAP apply. The plug-in of UMA-RR entity 204 is made transparent to the upper layer protocols in this way. Third, a UMA-RR entity 204 module is responsible for coordination with the GSM RR entity to manage access mode switching and handover, as described in further detail in application Ser. No. 10/688,470, now issued as U.S. Pat. No. 7,127,250.

Figure 2B:
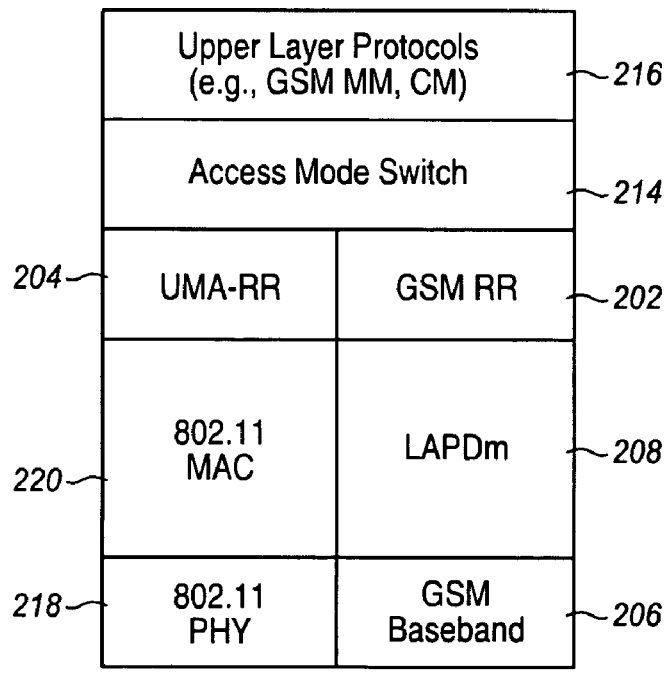
FIG. 2B illustrates an overview of a level 1, level 2, and level 3 GSM-related protocol architecture for one embodiment of a mobile station that provides unlicensed radio links via IEEE 802.11 signaling.

FIG. 2B provides an overview of a level 1, level 2, and level 3 GSM-related protocol architecture for one embodiment of mobile station 102 that provides unlicensed radio links via IEEE 802.11 signaling. All of the entities and layers are the same as described above for FIG. 2A, except that the Bluetooth layers have been replaced with an 802.11 PHY layer 218 and an 802.11 MAC layer 220.

Figure 3A:
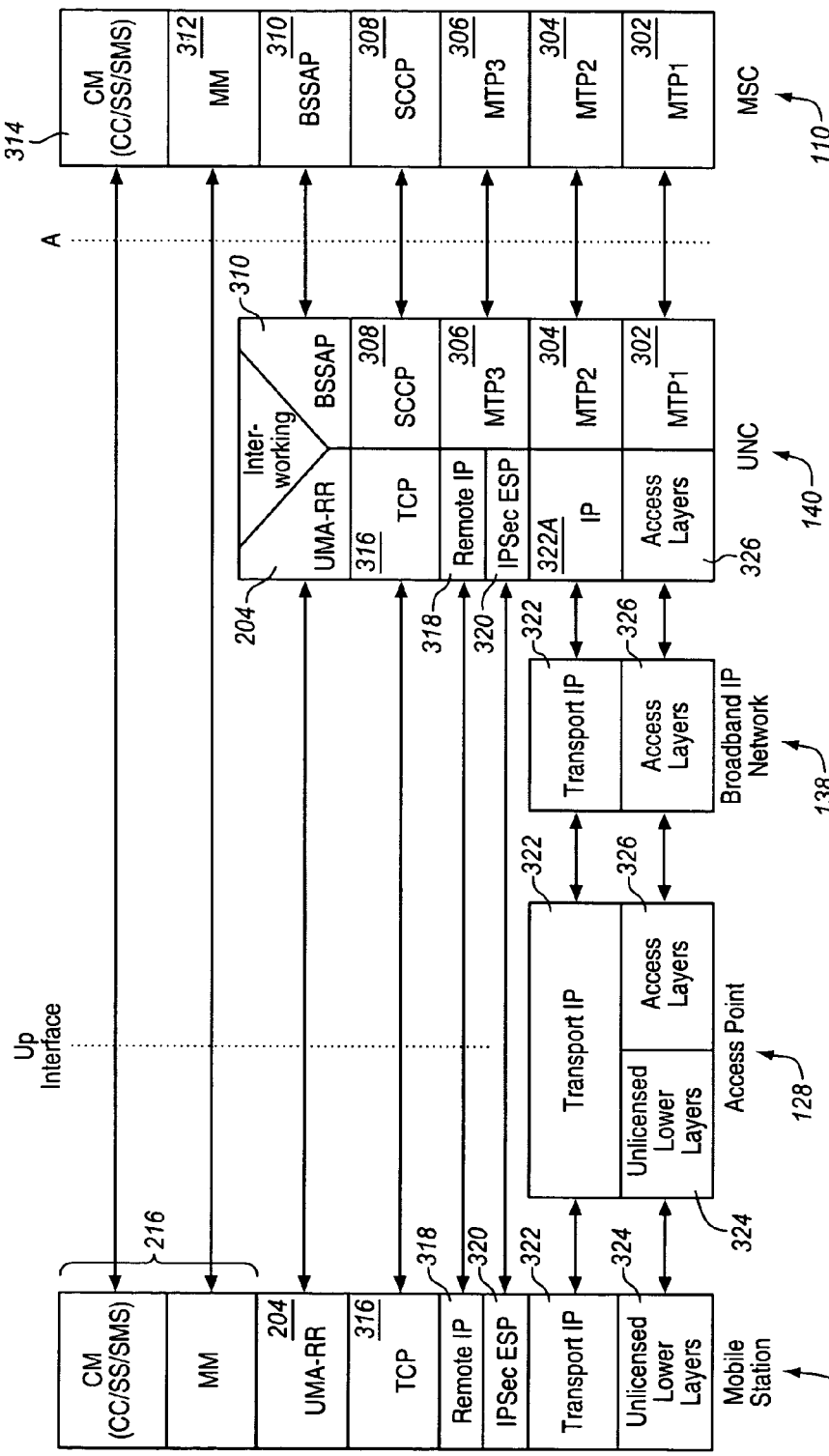
FIG. 3A illustrates the Up interface protocol architecture in support of CS Domain signaling, as well as UMA-specific signaling, according to one embodiment.

FIG. 3A illustrates the Up interface protocol architecture in support of circuit switched (CS) Domain signaling, as well as UMA-specific signaling, according to one embodiment. The MSC sublayers are conventional, well known features known in the art in regards to the message transfer part (MTP) interfaces MTP1 302, MTP2 304, and MTP3 306, signaling connection control part (SCCP) 308, base station system application part (BSSAP) 310, mobility management interface 312, and connection management interface 314.

The UMA-RR protocol supports the UMA "layer 3" signaling functions via UMA-RR layers 204 provided by each of the mobile station 102 and UNC 140. The UNC 140, acting like a BSC, terminates UMA-RR protocol messages and is responsible for the interworking between these messages and the analogous A-interface messages.

The layers below the UMA-RR layer 204 in each of mobile station 104 and UNC 140 include a TCP layer 316, a remote IP layer 318, and an IPSec (IP security) layer 320. As an option, a standard Secure Socket Layer (SSL) protocol running over TCP/IP (not shown) may be deployed in place of IPSec layer 320.

Lower-level IP connectivity between mobile station 102 and UNC 140 is supported by appropriate layers hosted by an intervening access point 128 and broadband IP network 138 (i.e., the access network 138 shown in FIG. 1A). The components for supporting the IP transport layer (i.e., the conventional network layer 3 under the seven-layer OSI model) include a transport IP layers 322 for each of the mobile station 104, AP 128, and IP network 138, and an IP layer 322A at UNC 140.

At the lowest layers (i.e., the physical and data link layers), mobile station 104 and AP 128 are depicted as providing unlicensed lower layers 324, while each of AP 128, IP network 138, and UNC 140 provide appropriate access layers 326. Typically, access layers 326 will include conventional Ethernet PHY and MAC layers (IEEE 802.3), although this is not limiting.

Figure 3B:
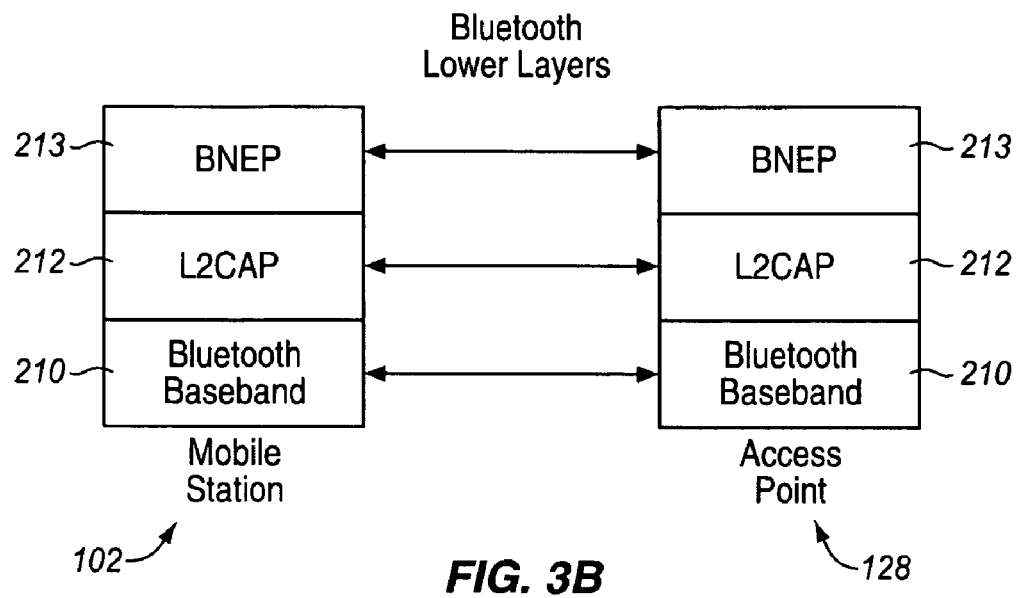
FIG. 3B shows Bluetooth lower layers employed by a mobile station and access point to facilitate physical layer communications.

As shown in FIGS. 3A and 3B, the unlicensed layers lower layers 324 will depend on whether the unlicensed radio link uses Bluetooth signaling or IEEE 802.11 signaling. The Bluetooth lower layers depicted in FIG. 3A correspond to the mobile station architecture of FIG. 2A, and include a Bluetooth baseband layer 210, an L2CAP layer 212, and a BNEP layer 213. Meanwhile, the 801.11 lower layers shown in FIG. 3B correspond to the mobile station architecture of FIG. 2B, and include a 802.11 PHY layer 218 and in 802.11 MAC layer 220.

Figure 3C:
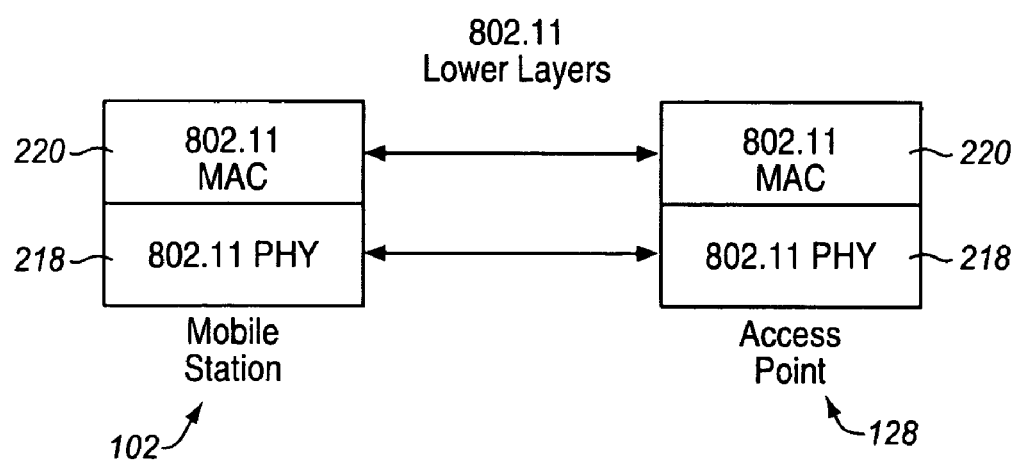
FIG. 3C shows Bluetooth lower layers employed by a mobile station and access point to facilitate physical layer communications.
Figure 3D:
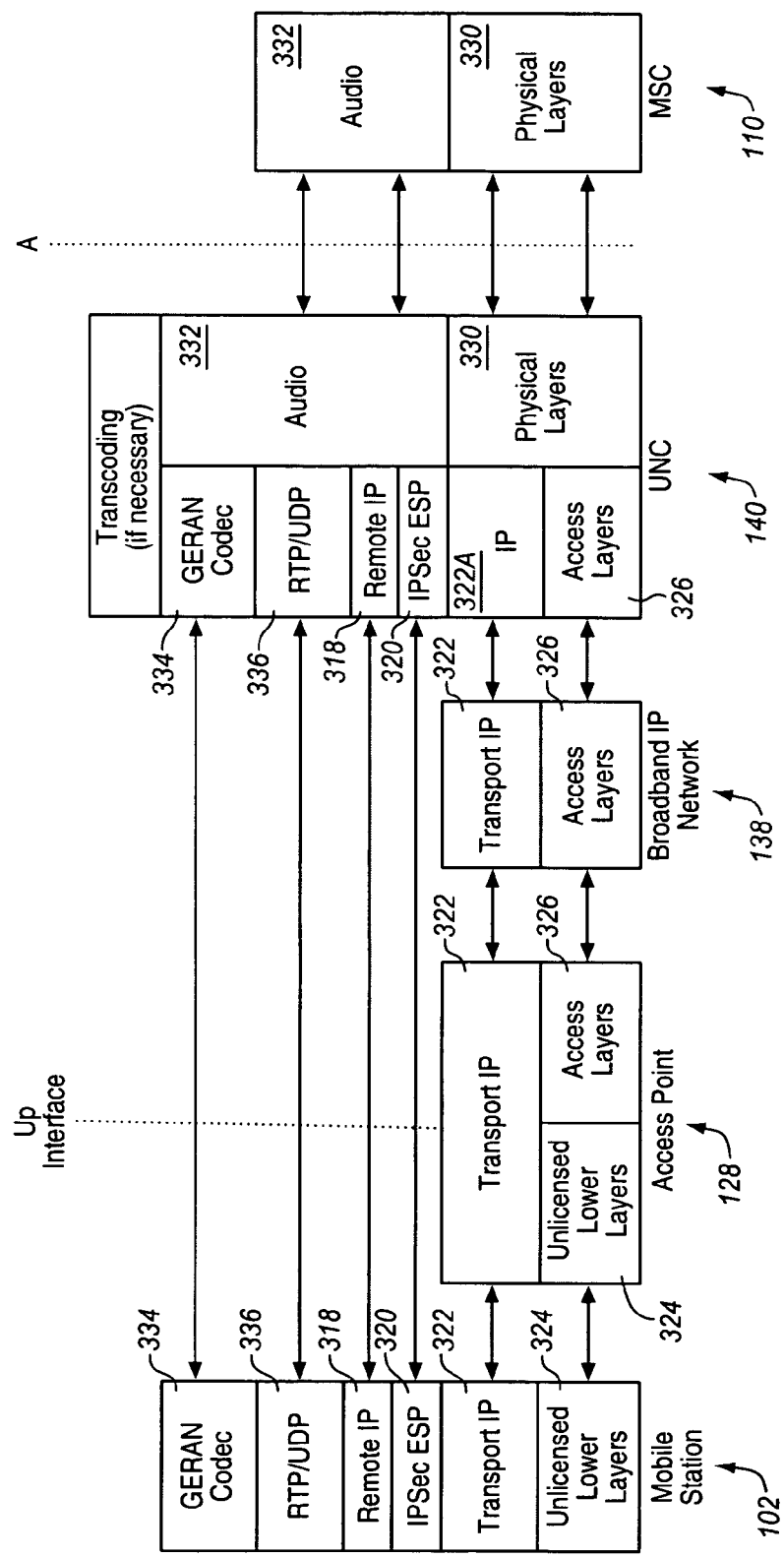
FIG. 3D illustrates the Up CS domain voice bearer protocol architecture in support of GSM voice transmission, according to one embodiment.

FIG. 3D illustrates the Up CS domain voice bearer protocol architecture in support of GSM voice transmission, according to one embodiment. In addition to the like named and referenced components common to the architectures of FIGS. 3D and 3C, facilities are provided for supporting GSM voice transmission. For the MSC 110, these components include conventional components for supporting GSM voice transmissions, and are depicted as physical layers 330 and audio 332, with similar components being deployed in UNC 140. Each of mobile station 102 and UNC 140 now include a GERAN (GSM Edge Radio Access Network) codec 334 and an RTP/UDP layer 336.

Under the architecture of FIG. 3D, audio flows over the Up interface according to the RTP framing format defined in RFC 3267 and RFC 3551. When operating in UMA mode, support for AMR FR as specified in TS 26.103 is supported. Other codecs may also be supported, such as G.711.

As noted above, the mobile station may be, for example, a wireless phone, smart phone, personal digital assistant, or mobile computer. The mobile station may also be, for example, a fixed wireless device providing a set of terminal adapter functions for connecting Integrated Services Digital Network (ISDN) or Plain Old Telephone Service (POTS) terminals to the wireless system.

Other terminal adapter types than those listed above may be employed with embodiments of the present invention. For example: (1) a terminal adapter that supports cordless telephones rather than POTS phones; (2) a terminal adapter that supports standard Session Initiation Protocol (SIP) telephones; and (3) a terminal adapter that also integrates a corded handset and user interface, such as one would find on a desk phone. In each case, the invention described herein describes how these terminal adapter functions can be connected to the wireless system via the unlicensed network.

The use of other standard Bluetooth capabilities together with embodiments of the present invention is possible. For example, there is a Bluetooth standard capability called "SIM Access Profile" that allows one Bluetooth device (e.g., an embedded cell phone subsystem in a car) to access the SIM that is in another Bluetooth device (e.g., the user's normal cell phone), allowing the first device to take on the "personality" associated with the SIM (i.e., that of the user's normal cell phone). The embodiments described above could make use of this standard capability to give the terminal adapter-attached devices (e.g., a POTS phone) the personality of the user's cell phone.

Media Signaling

In the present description, the GSM BSSMAP (Base Station Subsystem Management Application Part) protocol is modified for use over the interface between an UNC (UMA (Unlicensed Mobile Access) Network Controller) and an MSC (Mobile Switching Center) or a 3GPP (Third Generation Partnership Project) Release 4 MSC Server. This MSC server uses the "Release 4 distributed MSC Architecture" as defined in the 3GPP TS 23.002 standard. Modifications are made to the BSSMAP protocol and the A interface.

FIG. 4, shows a conventional context for an A Interface of a UNC and MSC system architecture. As shown in FIG. 4, customer premises equipment (CPE) 411 is coupled through a broadband access network 413, such as a wide area network or the Internet to a UNC 415. In the example of FIG. 4, the CPE is shown as a mobile station, such as a wireless or mobile phone shown as 102 in FIG. 1, coupled through an Up radio interface to a wireless access point (AP) shown as 128 in FIG. 1. A variety of types of CPE implementations may be used instead of the MS, AP combination shown. For example an IBS (Indoor Base Station), a VoIP (Voice over Internet Protocol) telephony modem, a UMA (Universal Mobile Access) modem or a private IP branch exchange may be used.

The UNC, which may be similar to the UNC shown as 140 in FIG. 1, is shown as including a security gateway 417 to terminate the secure tunnel between the MS and the UNC. The security gateway is coupled to a control server and to a media gateway 420 or TRAU (Transcoder and Rate Adaptation Unit). The control server handles signaling with a PLMN 421. In one embodiment, the UNC emulates a BSC (Base Station Controller) and uses signaling protocols, such as A interface protocols designed for communication between an MSC and a BSC. The UNC may also include other components depending on the particular implementation. In one embodiment, the UNC is in the form of an INC (Internet Protocol Network Controller)

FIG. 4 shows a few of the components of the PLMN 421 which, in this example, includes a telephony switching center 425, such as an MSC Call Server. The MSC Call Server has a DTAP (Direct Transfer Application Part) and BSSMAP connection to the UNC. The PLMN also has a media gateway 427 that is coupled to the media gateway 420 of the UNC and to the MSC Call Server. The media gateway and the MSC Call Server communicate with the UNC using the A interface. The MSC Call Server and media gateway are further coupled to the rest of the PLMN 429, which may include SGSNs, GGSNs, MSC servers, and media gateways as well as BSSs and other UNCs, etc. The PLMN may have further connections to the Internet, the PSTN (Public Switched Telephone Network), and other resources.

FIG. 5, shows the impact of modifications to the A Interface on the UNC and MSC system architecture. As shown in FIG. 5, the modifications allow traffic to be communicated between a UMA subscriber and a PLMN without a media gateway or TRAU (Transcoder and Rate Adaptation Unit) function in the UNC. This reduces the cost of the system and improves the system's quality.

As shown in FIG. 5, the mobile station and AP 511 are coupled through a broadband access network 513 to a UNC 515. The UNC includes a security gateway 517 and a control server 519, but no media gateway. The PLMN 521 includes an MSC Call Server 525 coupled to the UNC control server and a media gateway 527 which in this case is coupled to the security gateway 517 of the UNC 515. The MSC Call Server and media gateway are coupled to the rest of the PLMN 529, which may include many other resources.

In the enhanced UMA architecture of FIG. 5, the UNC and the MSC communicate with a modified set of messages that may be based on the standard BSSMAP messages used for communications between an MSC and a BSC. The MSC Call Server and the media gateway communicate using messages that may be based on the standard A interface messages. BSSMAP messages that may be modified include ASSIGNMENT REQUEST, ASSIGNMENT COMPLETE, HANDOVER REQUEST, and HANDOVER DETECT.

Message Structures

Capabilities may be added to the system by adding some additional messages in order to support UMA features. These messages may include CHANNEL MODE MODIFY REQUEST, CHANNEL MODE MODIFY ACKNOWLEDGE, and UPLINK QUALITY INDICATION. These messages and the modified messages are described in more detail below. These new messages may be supported within the existing BSSMAP message system by assigning new message type IE (information element) values to them. Examples of possible IE values are as follows:

TABLE 1

| | |
|---|---|
| Channel Mode Modify | 10000000 |
| Channel Mode Modify Acknowledge | 10001001 |
| Uplink Quality Indication | 10001010 |

The ASSIGNMENT REQUEST message is sent from the MSC to the UNC via the relevant SCCP (Signaling Connection Control Part) connection in order to request the UNC to assign radio resources and to establish a terrestrial connection, the attributes of the connection in terms of signaling and of bearer traffic are defined within the message. The message is composed of a set of IEs (information elements) of various types. Some of this message's IEs are listed below.

TABLE 2

| | |
|---|---|
| CIC (Carrier Identification Code) | This IE is an optional part of the BSSMAP message and is not needed with the modified BSSMAP message |
| IP (Internet Protocol) Address | These IEs are used to describe the VoIP connection parameters that have been allocated by the MSC. |
| Sample Size | |
| RTP UDP Port | |
| RTCP UDP Port | |
| Payload Type | The Payload Type IE can be used in a modified message if a payload with a dynamic type is used |
| RTP Redundancy Configuration | The RTP Redundancy Information IE is included if the speech codec FR AMR is signaled. |

The ASSIGNMENT COMPLETE message is sent from the UNC to the MSC in response to the ASSIGNMENT REQUEST message and indicates that the requested assignment has been completed. Some of this message's IEs are listed below.

TABLE 3

| | |
|---|---|
| IP Address | These IEs are used to describe the VoIP connection parameters that have been allocated by the UNC |
| Sample Size | |
| RTP UDP Port | |
| Payload Type | The Payload Type IE may be used if a dynamic payload type is used. It defines the Payload Type selected by the UMA MS |
| RTP Redundancy Configuration | The RTP Redundancy Information IE may be used if the speech codec FR AMR is specified. It defines RTP redundancy information adjusted based on the UMA MS capabilities |

The HANDOVER REQUEST message is sent from the MSC to the UNC via the relevant SCCP connection to indicate that the UMA MS is to be handed over to the UMAN (UMA Network). This corresponds to situations in which a connection is handed over from another BSS handing over to the same MSC or another MSC rather than when a call is initiated and an assignment is requested. Some of this message's IEs are listed below.

TABLE 4

| | |
|---|---|
| Sample Size | As with the ASSIGNMENT REQUEST, these elements may be used to describe the VoIP connection parameters that have been allocated by the MSC |
| IP Address | |
| RTP UDP Port | |
| RTCP UDP Port | |
| Payload Type | As with the ASSIGNMENT REQUEST, the Payload Type IE is included if a dynamic payload type is used |
| Multi Rate Configuration | As with the ASSIGNMENT REQUEST, the Multi-rate Configuration IE is included if the speech codec FR AMR is signaled |
| RTP Redundancy Configuration | As with the ASSIGNMENT REQUEST, the RTP Redundancy Information IE is included if the speech codec FR AMR is signaled |

The HANDOVER DETECT message is sent by the UNC to the MSC in response to the HANDOVER REQUEST message and indicates that the UMA MS has successfully accessed the UMA system. This message's IEs are similar to that of the ASSIGNMENT COMPLETE message. Some of this message's IEs are listed below.

TABLE 5

| | |
|---|---|
| Sample Size | As with the ASSIGNMENT COMPLETE message, these IEs describe the VoIP connection parameters that have been allocated by the UNC |
| RTP UDP Port | |
| IP Address | |
| RTCP UDP Port | |
| Payload Type | As with the ASSIGNMENT COMPLETE message, the Payload Type IE is used if a dynamic Payload Type is used. It defines the Payload Type selected by the MS |
| RTP Redundancy Configuration | As with the ASSIGNMENT COMPLETE message, the RTP Redundancy Information IE is used if the speech codec FR AMR is signaled. It defines RTP redundancy information adjusted based on the MS capabilities |

The CHANNEL MODE MODIFY message is sent by the MSC to the UNC to request modifications related to an existing UMA bearer channel and associated RTP stream. Such an existing bearer channel and RTP stream would likely be established through the ASSIGNMENT REQUEST message or the HANDOVER REQUEST message. The IEs are similar to those described above and a list follows. In one embodiment, the message is shortened by including only IEs that describe requested modifications from the existing bearer channel and associated RTP stream.

TABLE 6

| | |
|---|---|
| Channel Mode | These IEs are included if the modification of the associated parameter is requested; i.e. Sample Size is included if Sample Size is modified and is not included if it remains the same |
| Sample Size | |
| IP Address | |
| RTP UDP Port | |
| RTCP UDP Port | |
| RTP Redundancy Configuration | |
| Multi Rate Configuration | The Multi Rate Configuration IE may be used only when the speech codec signaled is FR AMR and when the RTP Redundancy configuration is modified |

The CHANNEL MODE MODIFY ACKNOWLEDGE message is sent by the UNC to the MSC in response to the CHANNEL MODE MODIFY message to acknowledge modifications related to the existing UMA RR bearer channel and associated RTP stream. This message contains IEs similar to the response messages mentioned above. Some are listed below.

TABLE 7

| | |
|---|---|
| Channel Mode | These IEs are included if the modification of the associated parameter is requested; i.e. Sample Size is included if Sample Size is modified and is not included if it remains the same |
| Sample Size | |
| RTP Redundancy Configuration | |
| Multi Rate Configuration | The Multi Rate Configuration IE is included when the speech codec signaled is FR AMR and when the RTP Redundancy configuration is modified |

A further message, an UPLINK QUALITY INDICATION message can be sent by the MSC to the UNC as a notification that the uplink quality deteriorated below the threshold and can not be further improved with channel modification. This can be used instead of a CHANNEL MODE MODIFY ACKNOWLEDGE message or as a separate message sent on its own timing.

Modified Protocol Architectures

Figure 6A:
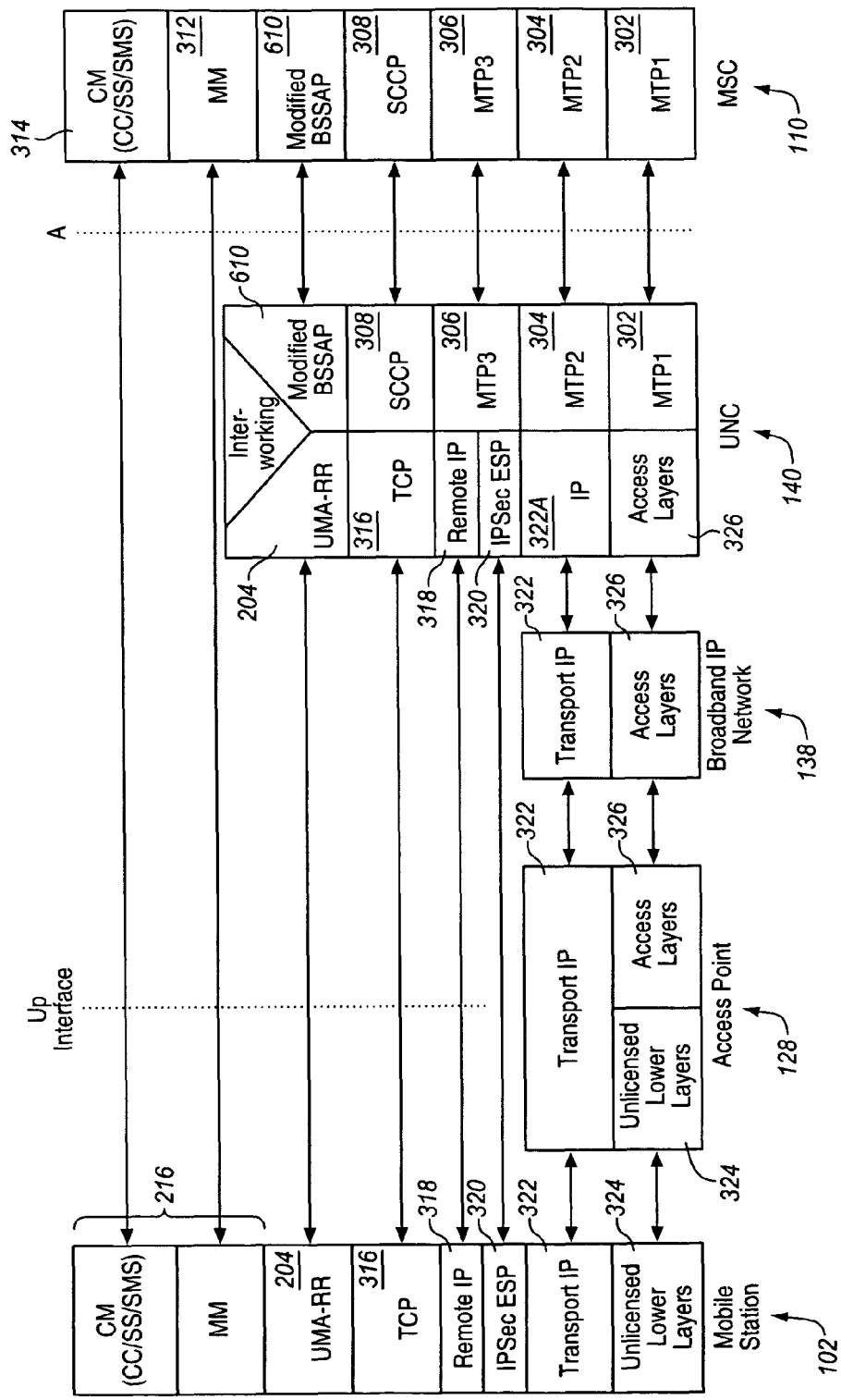
FIG. 6A illustrates an enhanced Up interface protocol architecture in support of CS Domain signaling, as well as UMA specific signaling in accordance with one embodiment.

FIG. 6A illustrates a modification to the Up interface protocol architecture of FIG. 3A in support of circuit switched (CS) Domain signaling, as well as UMA-specific signaling, according to one embodiment. The MSC sublayers are similar to those described above for FIG. 3A. The BSSMAP protocol (part of BSSAP 610), however, is modified to support the modified and additional messages over the modified A interface between the UNC and the MSC. This may include use of the modified and additional A-interface messages described above. The layers below the Up interface protocols are not changed.

Figure 6B:
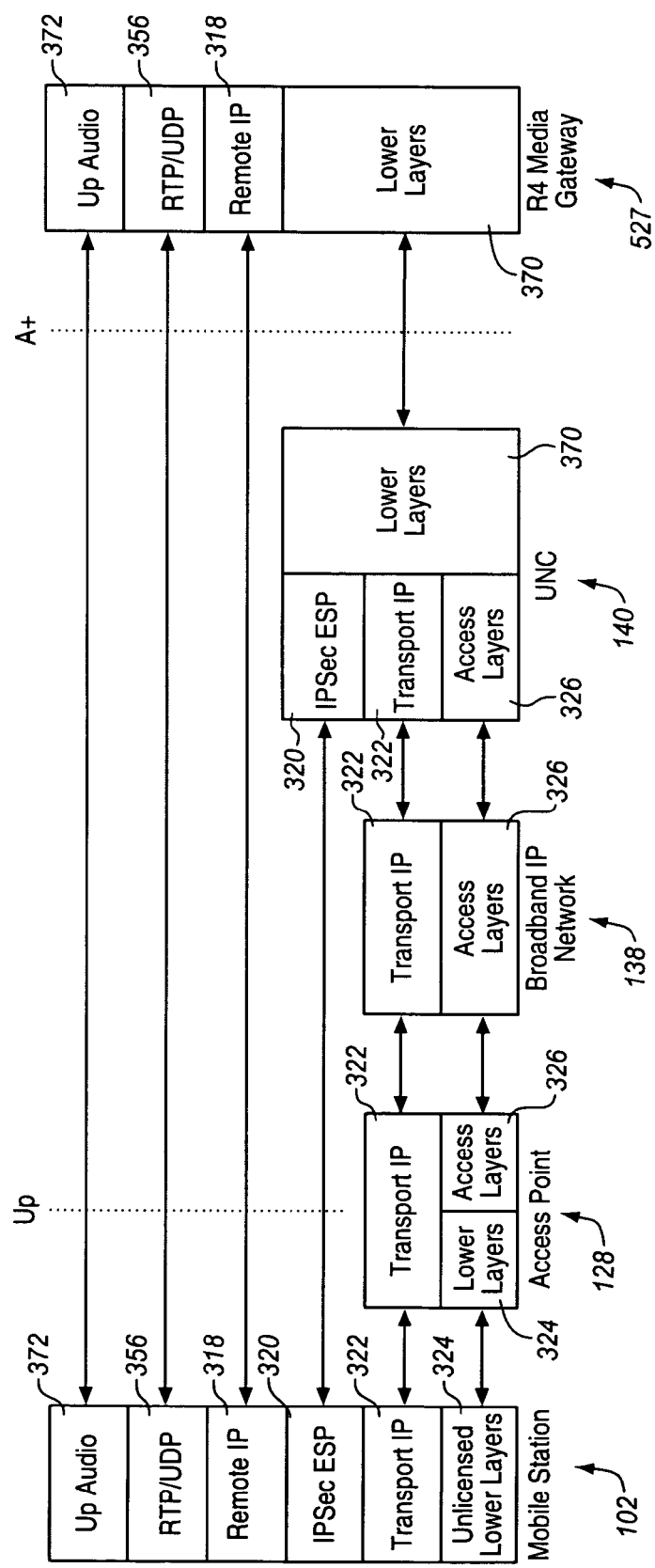
FIG. 6B illustrates an enhanced Up Audio interface protocol architecture with direct passage of higher layers to a media gateway, according to one embodiment.

FIG. 6B illustrates a modification of Up Audio protocol architecture, according to an embodiment, that may be implemented in the architecture of FIG. 5. This Up Audio architecture allows audio bearer packets 372 to be carried straight through from the MS 102 to the R4 Media Gateway 527 of the PLMN 521. The same applies to remote IP packets 318 and above. In FIG. 6B, this includes RTP/UDP signaling 356.

As illustrated in FIG. 6B, the UNC 140 and media gateway 527 employ conventional facilities for supporting Up audio bearer data packets, including lower layers 370 that may include access layers 326, transport IP 322 and an IPSec ESP layer 320. However, the Remote IP layer 318, RTP/UDP layer 356 and Up audio layer 372 are not shared with the access point 128, IP network 138 or UNC 140. These are transmitted through these elements directly between the MS and the media gateway.

Under the architecture of FIG. 6B, Up audio does not need to be transcoded or repacketized for any of the intermediate elements in the communication chain. The transcoding, signaling and codecs of FIG. 3D are avoided. This eliminates the need for a media gateway in the UNC, reducing costs and increasing reliability.

Example Signaling Transactions

Figure 7:
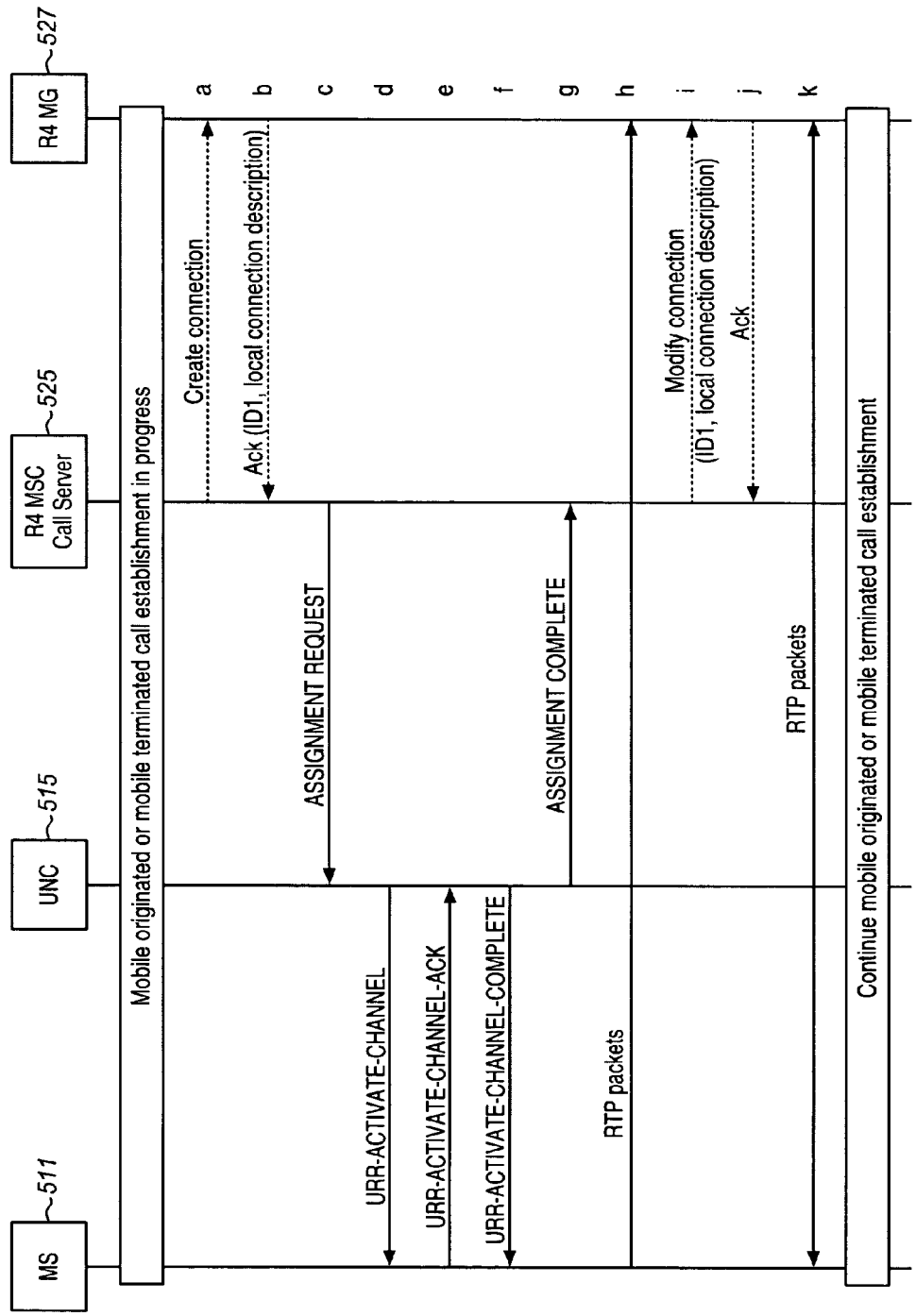
FIG. 7 is a message and data flow diagram illustrating messages and operations employed to establish a connection between a mobile station and a MSC Call Server, according to one embodiment.

FIG. 7 shows one procedure associated with successfully establishing a voice channel between the MS 511 and the MSC (i.e., shown as consisting of a MSC Call Server 525 and a Media Gateway 527) for mobile-originated or mobile-terminated call purposes. FIG. 7 does not show any connection signaling associated with the call that is not directly related to the connection to the MS (e.g., ISUP (ISDN (Integrated Services Digital Network) User Part) signaling towards the other party.

Initially, a mobile-originated or mobile-terminated call establishment is in progress. The MSC Call Server determines that a speech channel to the target MS is required. Accordingly, at line A, the MSC Call Server requests that the media gateway (MG) 527 create a VoIP connection. The communication between the MSC Call Server and the MG may be in the form of a media gateway control protocol, such as H.248. Using this protocol, many different parameters for the VoIP connection may be set. This request includes an identification of the codec or codecs that are allowed for the connection. At line B, the MG creates the connection and returns a connection ID and a local connection description that includes the assigned MG IP address and port number for the connection.

At line C, the MSC Call Server sends an ASSIGNMENT-REQUEST message to the UNC. The ASSIGNMENT-REQUEST message may include any of the IEs mentioned above and may include information describing the connection to the MG encoded into a BSSMAP format.

Upon receiving the ASSIGNMENT-REQUEST message, the UNC at line D sends a URR-ACTIVATE-CHANNEL message to the MS at line D. This message includes the information received in the ASSIGNMENT-REQUEST message from the MSC Call Server. The URR-ACTIVATE CHANNEL message together with the other messages between the MS and the UNC, may be based on those defined in the UMA (Universal Mobile Access) standard, however other messages may be used to signal the CPE to activate a channel.

At line E, the MS establishes a VoIP connection to the IP address and port identified in the URR-ACTIVATE-CHANNEL message. The MS then returns a URR-ACTIVATE-CHANNEL-ACK message to the UNC, including the required connection information. This information may include such parameters as: RTP UDP Port number, sample size, payload type and RTCP UDP Port number. At line F, the UNC sends the URR-ACTIVATE-CHANNEL-COMPLETE message to the MS.

If the connection is not established, then the UNC may send a BSSMAP ASSIGNMENT-FAILURE message (not shown) to the MSC Call Server. The MSC Call Server then initiates call clearing using, for example, a BSSMAP CLEAR-COMMAND message.

Using the information received from the MS in the URR-ACTIVATE CHANNEL ACK message, the UNC can provide full connection information back to the MSC Call Server. At line G, the UNC signals the MSC Call Server that assignment is complete using an ASSIGNMENT-COMPLETE message, including the connection information received from the MS.

At line I, the MSC Call Server requests the MG to modify the previously-created VoIP connection to use the codec and remote IP address and port identified in the ASSIGNMENT-COMPLETE message. At line J the MG modifies the connection, and at line K, RTP packets are flowing in both directions between the MS and the MG, via the broadband IP network. Call establishment may then continue to any other terminals involved in the call.

Figure 8:
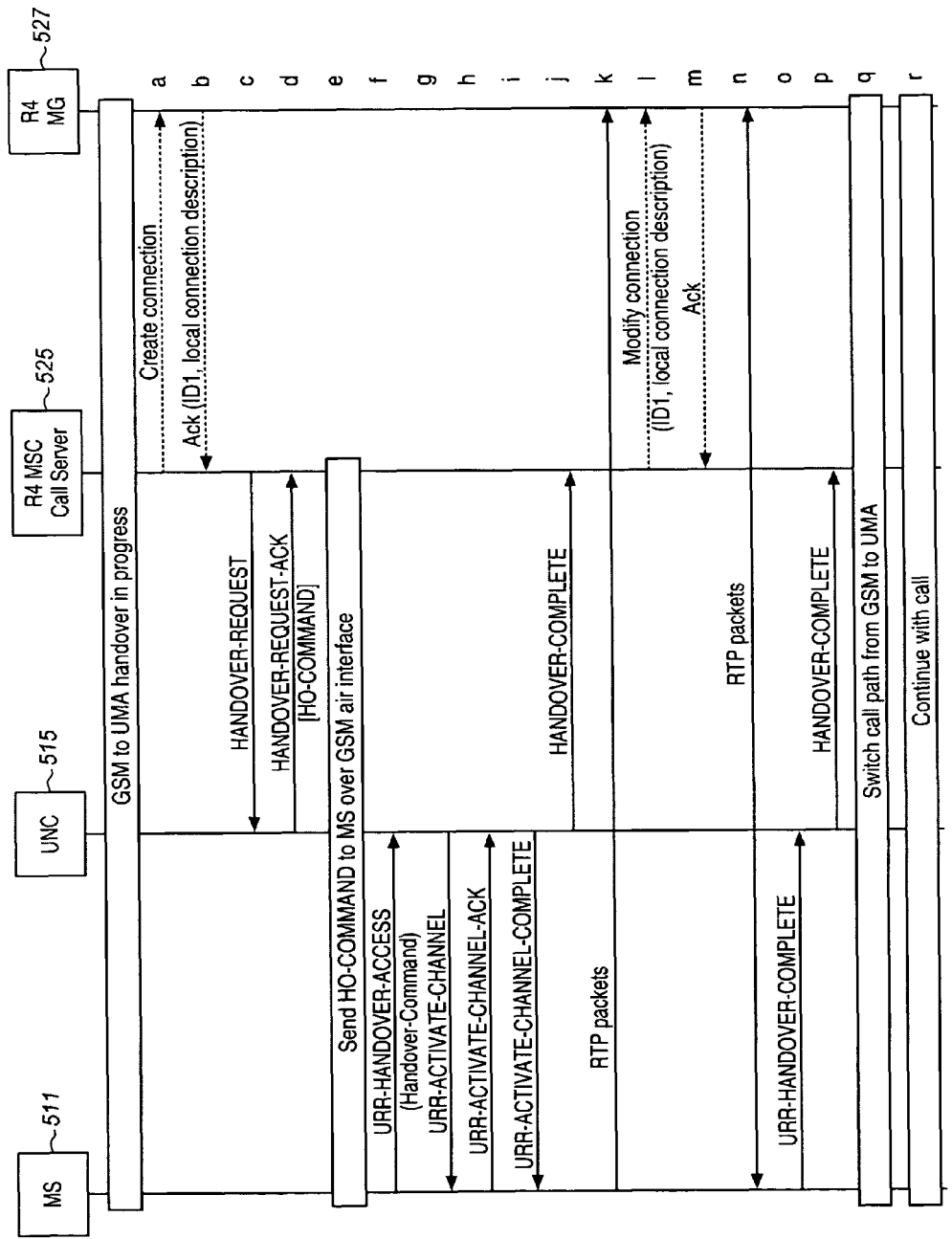
FIG. 8 is a message and data flow diagram illustrating messages and operations employed to handover a call from a licensed base station to a mobile wireless LAN according to an embodiment.

FIG. 8 shows an example of messages that may be used to establish a voice channel between an MS 511 and the MSC 525, 527 for GSM-to-AP handover purposes. As in FIG. 7, the signaling not directly related to the MS to MSC Call Server connection is not shown (e.g., GSM signaling towards the other called party).

In FIG. 8, a GSM-to-UMA or AP handover is in progress. In other words, the MS 511 is in a call through a GSM air interface to a BTS (Base Transceiver Station). The MS is in the process of handing over that call to the UMAN. To accomplish the handover, a speech channel between the MS and the MSC may be used. Accordingly, at line A, the MSC Call Server 525 requests that the media gateway (MG) 527 create a VoIP connection. This request includes the parameters for the codec or codecs that are allowed for the connection. At line B, the MG creates the connection and returns a connection ID and a local connection description that includes the assigned MG IP address and port number for the connection.

Using the received information, the MSC Server encodes any required connection description information in a HANDOVER-REQUEST message as described above. At line C, this message is forwarded to the UNC, and at line D, the UNC responds with a standard BSSMAP HANDOVER-REQUEST-ACK message containing an encapsulated HANDOVER-COMMAND message formulated according to the standard GERAN (GSM EDGE (Enhanced Data Rate for GSM Evolution) Radio Access Network) procedure.

At line E, the MSC Server directs a GSM BSC (Base Station Controller) (not shown) to send a HANDOVER- COMMAND message to the MS via the GSM air interface (not shown). At line F, in response to the HANDOVER-COMMAND message, the MS sends an URR-HANDOVER-ACCESS message to the UNC containing the HANDOVER-COMMAND that it received through the GSM air interface. The UNC correlates this signal with the handover request that it responded to on line C.

Lines G-I show operations similar to those of lines D-F of FIG. 7. At line G the UNC sends an URR-ACTIVATE-CHANNEL message to the MS that includes the information received in the HANDOVER-REQUEST message from the MSC Call Server. At line H, the MS, returns a URR-ACTIVATE-CHANNEL-ACK message to the UNC including the required connection information such as: RTP UDP Port #, sample size, payload type and RTCP UDP Port #. At line I, the UNC sends the URR-ACTIVATE-CHANNEL-COMPLETE message to the MS, completing the connection between the MS and the UNC.

At line J, the UNC signals the MSC Call Server that the MS has accessed the UNC system via the HANDOVER-DETECT message described above, that includes the connection information received from the MS. Lines K-M show signaling similar to that of lines H-J in of FIG. 7. Line K shows RTP packets flowing in one direction from the MS to the MG, via the UNC 515. At line L, the MSC Call Server requests the MG to modify any previously created VoIP connection to use the codec and remote IP address and port identified in the HANDOVER-DETECT message. At line M, the MG modifies the connection, and at line N, RTP packets are flowing in both directions between the MS and the MG, via the access router.

At line O, the MS signals the successful completion of the handover by sending the URR-HANDOVER-COMPLETE message to the UNC. At line P, the UNC signals successful completion of the handover by sending a BSSMAP HANDOVER-COMPLETE message to the MSC Call Server, and at line Q, the MSC Server responds by switching the call path from GSM public air interface to the UNC. This allows the call to continue uninterrupted at line R.

The handover may fail for any number of reasons which may result in the mobile retaining the connection with the GSM BTS, or it may result in the call being dropped. For example, if the MSC Server fails to create the MG connection, or if the UNC connection is not established, then the MSC Server may abort the handover. If the MSC Server fails to modify the MG connection, then the MSC Server may clear the call (e.g., send a BSSMAP CLEAR-COMMAND message).

Figure 9:
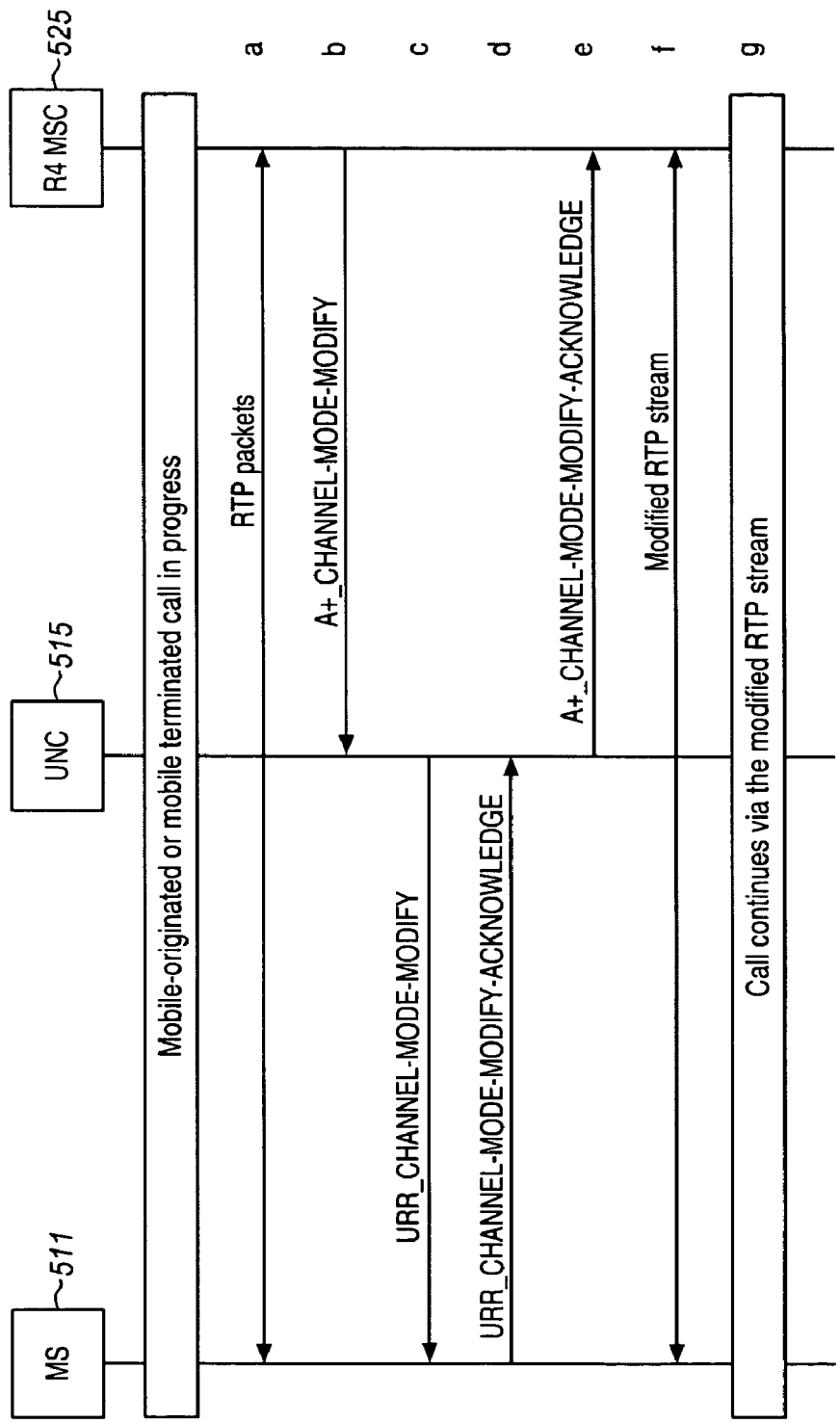
FIG. 9 is a message and data flow diagram illustrating messages and operations employed to modify a bearer connection according to an embodiment.

FIG. 9 shows an example of modifying the bearer connection between the MS and the MSC. In the example of FIG. 9, a mobile originated or mobile terminated call is in progress and the MSC Call Server determines that the bearer connection has to be modified. This may be due, for example, to detecting the loss of too many RTP packets. One example of a modification of a bearer connection is to apply RTP Redundancy. At line A, the RTP session is established and RTP packets are exchanged in both directions. The MSC determines that a modification to the bearer connection is called for and determines what parameters need to be modified. Accordingly, at line B, the MSC prepares a CHANNEL-MODE-MODIFY message, as described above, specifying the parameters that need to be modified and sends this message to the UNC.

At line C, the UNC constructs a URR-CHANNEL-MODE-MODIFY message based on the request form the MSC and forwards it to the MS. At line D, the MS modifies the connection in accordance with the request and responds with an acknowledgment message, URR-CHANNEL-MODE-MODIFY ACKNOWLEDGMENT. The UNC forwards the acknowledgment to the MSC at line E. However, if the MS is not able to handle the requested modification, then the MS will so indicate in the acknowledgment message.

In the example of modifying the channel mode to include RTP redundancy, the MS can reply by sending an acknowledgment that does not include the requested modification to the IE corresponding to RTP redundancy. In another example, if the modification relates to IP addresses and UDP ports, then if the MS is not able to make the change, the call may continue on the original ports, or if these are unavailable then the call may be cleared. In parallel, the MS and MSC modify the RTP stream associated with this connection and, at line F, the modified RTP packets are now exchanged between the MS and MSC. The call continues at line G using the modified RTP stream.

Figure 10:
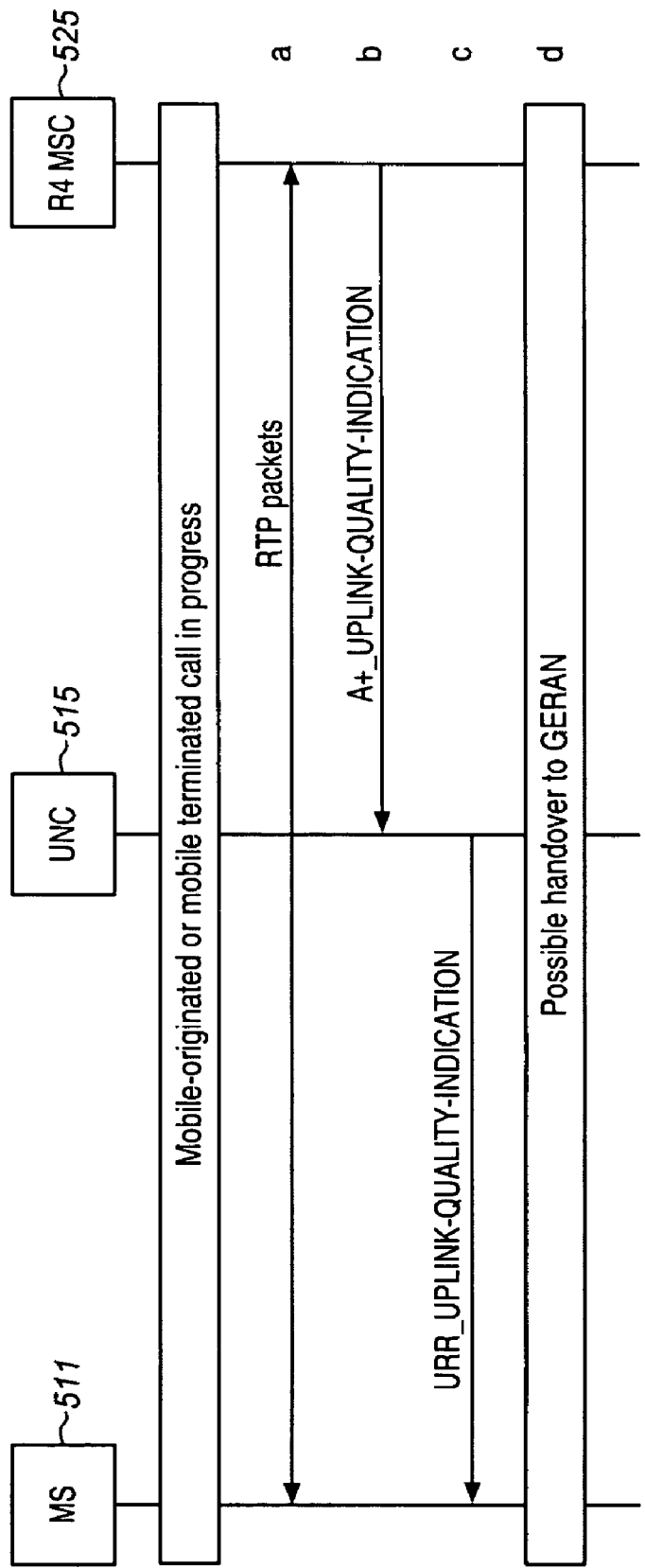
FIG. 10 is a message and data flow diagram illustrating messages and operations employed to indicate uplink quality according to an embodiment.

FIG. 10 shows an example of providing an indication of the quality of the uplink channel from the MSC to the MS. These operations may be used by the MSC to notify the UNC when the uplink quality associated with a particular bearer connection falls below a predefined threshold or experiences a large change. It may also be used if the uplink quality degrades and is not improved by a channel mode modify procedure as shown in FIG. 9.

Initially, a mobile originated or mobile terminated call is in progress. At line A, an RTP session is established and RTP packets are exchanged in both directions. The MSC determines that an uplink quality indication is to be sent. This may occur, for example, because the uplink quality associated with the bearer connection is below a predefined threshold for uplink quality and all attempts to improve the quality have failed.

At line B, the MSC sends an UPLINK-QUALITY-INDICATION message, such as the one described above, to notify the UNC. At line C, the UNC constructs a URR-UPLINK-QUALITY-INDICATION message based on the indication from the MSC and forwards it to the UMA MS. Upon receiving such a message, the MS may take any appropriate measure. In the example of FIG. 10, at line D, the MS initiates a handover to a GERAN connection.

The particular equipment, services, sequences of events and types of signals are provided above as examples only. While the example of FIGS. 7, 8, 9, and 10 are presented in the context of a VoIP WLAN AP and a GSM cellular network, appropriate modifications may be made to comply with other types of networks and protocols. In addition to a wireless mobile station and a wireless access point, embodiments of the invention may be applied to other types of subscriber equipment including enterprise systems and networks, private and public switched networks and other wired, wireless and hybrid systems that may connect to a UNC or similar device through the Internet or through any other communications medium. In addition to a UNC, embodiments of the invention may be applied to other network devices that interface to a PLMN or PSTN. In addition to a GSM architecture, embodiments of the invention may be applied to other types of telecommunications networks, both wired and wireless, these may include those based on CDMA, TDMA, PCS (Personal Communication Services), PHS (Personal Handyphone System) and other standardized protocols. The protocol architecture diagrams described above are provided as examples only. Many of the layers may be grouped, divided or identified differently to suit a particular application. The components involved in communicating at any particular layer may also be modified to suit a particular application.

It is to be appreciated that a lesser or more equipped UNC, AP, mobile station, private network, and public network than the examples described above may be desirable for certain implementations. Additional or different components, interfaces, buses and capabilities may be used and additional devices may be added to any of these components. Some of the illustrated components may also be removed from the devices. The configuration of the UNC, AP, mobile station, private network, and public network may vary with different implementations depending upon numerous factors, such as price constraints, performance requirements, technological improvements, or other circumstances. It is not necessary that the licensed frequencies be used for a portion of the system nor that unlicensed frequencies be used for a portion of the system. It is further not necessary that a portion of the system be private and another portion be public.

Although the description of the various embodiments refers primarily to using location information in establishing a VoIP private network call through a GSM cellular telecommunications system, the various embodiments may also be used with other types of private communications systems and with other types of public telecommunications networks. The various embodiments may be applied to voice networks, data networks and combined networks whether they are circuit switched or packet switched.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, use specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX I

Table Of Acronyms

| | |
|---|---|
| AP | Access Point |
| ARFCN | Absolute RF Channel Number |
| ATM | Asynchronous Transfer Mode |
| ATM VC | ATM Virtual Circuit |
| BCCH | Broadcast Common Control Channel |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CGI | Cell Global Identification |
| CIC | Circuit Identity Code |
| CM | Connection Management |
| CPE | Customer Premises Equipment |
| CS | Circuit Switched |
| DTAP | Direct Transfer Application Part |
| FR AMR | Full Rate Adaptive Multi-Rate |
| GERAN | GSM Edge Radio Access Network |
| GGSN | Gateway GPRS Support Node |
| GMSC | Gateway MSC |
| GSM | Global System for Mobile Communication |
| GPRS | General Packet Radio Service |
| GSN | GPRS Support Node |
| GTP | GPRS Tunnelling Protocol |
| HLR | Home Location Register |
| IAN | Indoor Access Network (see also UMA Cell) |
| IBS | Indoor Base Station |
| IETF | Internet Engineering Task Force |
| INC | Internet Protocol Network Controller |
| IP | Internet Protocol |
| ISDN | Integrated Services Digital Network |
| ISP | Internet Service Provider |
| ISUP | ISDN User Part |
| MAC | Medium Access Control |
| MAP | Mobile Application Part |
| MG | Media Gateway |
| MM | Mobility Management |
| MS | Mobile Station |
| MSC | Mobile Switching Center |
| MTP1 | Message Transfer Part Layer 1 |
| MTP2 | Message Transfer Part Layer 2 |
| MTP3 | Message Transfer Part Layer 3 |
| PCM | Pulse Code Modulation |
| PCS | Personal Communications Services |
| PLMN | Public Land Mobile Network |
| POTS | Plain Old Telephone Service |
| PPP | Point-to-Point Protocol |
| PPPoE | PPP over Ethernet protocol |
| PSTN | Public Switched Telephone Network |
| QoS | Quality of Service |
| RF | Radio Frequency |
| RFC | Request for Comment (IETF Standard) |
| RLC | Radio Link Control |
| RR | Radio Resource Management |
| RTCP | Real Time Control Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SGSN | Serving GPRS Support Node |
| SMC | Short Message Service Centre |
| SMS | Short Message Service |
| SS | Supplementary Service |
| SSL | Secure Sockets Layer |
| TCAP | Transaction Capabilities Application Part |
| TCP | Transmission Control Protocol |
| TRAU | Transcoder and Rate Adaptation Unit |
| UDP | User Datagram Protocol |
| UMA | Unlicensed Mobile Access |
| UMAN | Unlicensed Mobile Access Network |
| UMTS | Universal Mobile Telecommunication System |
| UNC | UMA Network Controller (see also INC) |
| VLR | Visited Location Register |
| WLAN | Wireless Local Area Network |

What is claimed is:

1. A method comprising:
receiving, at a network controller of a first communication network that communicatively couples at least one service region of the first communication network to a licensed wireless second communication network, a description of a bearer connection from a call server of the second communication network, the bearer connection to be established between the second communication network and a subscriber device;
sending the description of the bearer connection from the network controller to the subscriber device to allow the subscriber device to establish the bearer connection through the network controller to the second communication network;
receiving, at the network controller, connection information about the established bearer connection from the subscriber device;
sending the connection information from the network controller to the call server to allow the call server to modify the bearer connection;
before the bearer connection is modified by the call server, forwarding RTP packets in only one direction at the network controller from the subscriber device to a media gateway of the second communication network; and
after the bearer connection is modified by the call server, forwarding RTP packets at the network controller (i) from the subscriber device to the media gateway and (ii) from the media gateway to the subscriber device.

2. The method of claim 1, wherein the bearer connection is a VoIP connection.

3. The method of claim 1, wherein the description of the bearer connection comprises an RTP port number and an IP address of the media gateway of the second communication network.

4. The method of claim 3, wherein the connection information about the established bearer connection comprises an RTP port number and an IP address of the subscriber device.

5. A method comprising:
receiving, at a network controller of a first communication network that communicatively couples at least one service region of the first communication network to a licensed wireless second communication network, a message from a call server of the second communication network, the message comprising a request for modification of an established bearer connection between the second communication network and a subscriber device through the network controller;
sending a request from the network controller to the subscriber device to modify the bearer connection based on the message from the call server;
when the subscriber device is able to modify the bearer connection, passing traffic packets through the network controller between the subscriber device and a mobile switching center (MSC) of the second communication network over the modified bearer connection; and
when the subscriber device is unable to modify the bearer connection, maintaining the bearer connection using an IP address and a UDP port associated with the bearer connection.

6. The method of claim 5 further comprising sending an acknowledgment from the subscriber device to the network controller in response to the request to modify the bearer connection.

7. The method of claim 6, wherein the modification of the bearer connection comprises applying RTP Redundancy.

8. The method of claim 7, wherein when the subscriber device is unable to modify the bearer connection, the acknowledgment comprises an indication that the subscriber device is unable to handle the requested modification.

9. The method of claim 5, wherein modification of the established bearer connection comprises modification to at least one of the IP address and UDP port associated with the bearer connection.

10. For a network controller of a first communication network that communicatively couples at least one service region of the first communication network to a licensed wireless second communication network, a non-transitory computer readable medium storing a computer program for execution by the network controller, the computer program storing sets of instructions for:
receiving a message from a call server of the second communication network, the message comprising a request for modification of an established bearer connection between the second communication network and a subscriber device through the network controller;
sending a request to the subscriber device to modify the bearer connection based on the message from the call server;
passing traffic packets through the network controller between the subscriber device and a mobile switching center (MSC) of the second communication network over the modified bearer connection when the subscriber device is able to modify the bearer connection; and
clearing an ongoing call on the established connection when the subscriber device is unable to modify the bearer connection.

11. The non-transitory computer readable medium of claim 10, wherein the computer program further comprises a set of instructions for sending an acknowledgment from the subscriber device to the network controller in response to the request to modify the bearer connection.

12. The non-transitory computer readable medium of claim 11, wherein when the subscriber device is unable to modify the bearer connection, the acknowledgment comprises an indication that the subscriber device is unable to handle the requested modification.

* * * * *